(12) United States Patent
Abedini et al.

(10) Patent No.: US 12,519,584 B2
(45) Date of Patent: Jan. 6, 2026

(54) LINK ESTABLISHMENT USING LEAKY-WAVE ANTENNAS

(71) Applicant: QUALCOMM Incorporated, San Diego, CA (US)

(72) Inventors: Navid Abedini, Basking Ridge, NJ (US); Kapil Gulati, Belle Mead, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 17/482,268

(22) Filed: Sep. 22, 2021

(65) Prior Publication Data

US 2023/0090399 A1    Mar. 23, 2023

(51) Int. Cl.
*H04L 5/00* (2006.01)
*H04B 7/06* (2006.01)
(Continued)

(52) U.S. Cl.
CPC .......... *H04L 5/0048* (2013.01); *H04B 7/088* (2013.01); *H04L 5/0053* (2013.01); *H04W 52/54* (2013.01);
(Continued)

(58) Field of Classification Search
None
See application file for complete search history.

(56) References Cited

U.S. PATENT DOCUMENTS

| 7,929,501 | B2 | 4/2011 | Leonidov et al. |
| 2009/0088090 | A1* | 4/2009 | Na ................ H04B 7/0617 455/101 |

(Continued)

FOREIGN PATENT DOCUMENTS

| EP | 3557914 A1 | 10/2019 | |
| EP | 3427342 B1 * | 2/2020 | ............. H01Q 1/243 |

(Continued)

OTHER PUBLICATIONS

Nokia., et al., "NR Random Access Procedure", 3GPP TSG-RAN WG1#88bis, R1-1704943, 3rd Generation Partnership Project (3GPP), Mobile Competence Centre, 650, Route Des Lucioles, F-06921, Sophia-Antipolis Cedex, France, vol. RAN WG1. No. Spokane. USA, Apr. 3, 2017-Apr. 7, 2017, Apr. 2, 2017, XP051243077, 11 Pages, Section 2.1, p. 2, section 3.1. 4.2. 4.3, figures 1. 3.

(Continued)

*Primary Examiner* — Jay L Vogel
(74) *Attorney, Agent, or Firm* — QUALCOMM Incorporated

(57) ABSTRACT

Methods, systems, and devices for wireless communication are described. A communication device may receive a beacon signal and, in response, may transmit a preamble based on an indicated preamble configuration. In some examples, the received beacon signal may be associated with one or more power signature identifier. In some cases, the communication device may determine a set of resource elements based on the one or more power signature and may transmit the preamble based on the determined set of resources elements. In some cases, in response to receiving the beacon signal, the communication device may transmit a report including an indication of the subset of resource elements. In some examples, a communication device may transmit a (Continued)

preamble that may include a request for cell information associated with a received beacon signal.

26 Claims, 20 Drawing Sheets

(51) Int. Cl.
  *H04B 7/08* (2006.01)
  *H04W 52/54* (2009.01)
  *H04W 72/044* (2023.01)
  *H04W 72/30* (2023.01)
  *H04W 74/0833* (2024.01)

(52) U.S. Cl.
  CPC ....... *H04W 72/0473* (2013.01); *H04W 72/30* (2023.01); *H04W 74/0833* (2013.01)

(56) References Cited

U.S. PATENT DOCUMENTS

| | | | |
|---|---|---|---|
| 2017/0303265 A1* | 10/2017 | Islam | H04B 7/0639 |
| 2019/0104551 A1 | 4/2019 | Deenoo et al. | |
| 2019/0140730 A1 | 5/2019 | Oteri et al. | |
| 2019/0215123 A1* | 7/2019 | Zhou | H04B 7/06952 |
| 2019/0223222 A1* | 7/2019 | Nagaraja | H04W 74/0833 |
| 2021/0176095 A1 | 6/2021 | Manolakos et al. | |

FOREIGN PATENT DOCUMENTS

| | | | | |
|---|---|---|---|---|
| WO | WO-2021066691 A1 * | 4/2021 | ......... | H04L 27/2605 |
| WO | WO-2021112999 A1 * | 6/2021 | ............ | H04W 16/28 |

OTHER PUBLICATIONS

Partial International Search Report—PCT/US2022/044008—ISA/EPO—Dec. 7, 2022.
International Search Report and Written Opinion—PCT/US2022/044008—ISA/EPO—Jan. 25, 2023.
Ghasempour Y., et al., "Single Shot Single Antenna Path Discovery in THz Networks", MobiCom, 2020, pp. 1-13.
Ghasempour Y., et al., "Single-Shot Link Discovery for Terahertz Wireless Networks", Nature communications, 2020, pp. 1-6.
Liu Y., et al., "True Time Delay Millimeter Wave Beam Steering with Integrated Optical Beamforming Network", Conference on Lasers and Electro-Optics (CLEO), IEEE, May 2019, 2 pages.

* cited by examiner

LINK ESTABLISHMENT USING LEAKY-WAVE ANTENNAS

FIELD OF TECHNOLOGY

The following relates to wireless communication, including link establishment using leaky-wave antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). These communication devices may perform a beam sweeping operation (e.g., a beam training operation) to conduct beamformed communications with other communication devices. In some cases, beam sweeping operations may relate to extended latency and increased overheard signaling.

SUMMARY

The described techniques relate to improved methods, systems, devices, and apparatuses that support techniques for wireless communication using leaky-wave antennas. A communication device may receive a control signal that may indicate a set of preamble configurations. In some cases, in response to receiving a beacon signal, the communication device may transmit a preamble based on an indicated preamble configuration. The received beacon signal may be associated with one or more power signature identifier. In some cases, the communication device may determine a set of resource elements based on the one or more power signature and may transmit the preamble based on the determined set of resources elements.

The communication device may transmit a preamble to establish a connection with another communication device, for example, as part of a beam training procedure. In some examples, the communication device may receive a beacon signal during a beacon occasion, and on a subset of resource elements that may correspond to an identifier of the other communication device. In some cases, in response to receiving the beacon signal, the communication device may transmit a report including an indication of the subset of resource elements. In some examples, the communication device may transmit a preamble that may include a request for cell information associated with a received beacon signal.

A method for wireless communication at a first device is described. The method may include receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers, receiving, from the second device, a beacon signal, determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers, generating a first preamble based on the determined preamble configuration, and transmitting the first preamble based on the generating.

An apparatus for wireless communication at a first device is described. The apparatus may include a processor, memory coupled with the processor, and instructions stored in the memory. The instructions may be executable by the processor to cause the apparatus to receive, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers, receive, from the second device, a beacon signal, determine a preamble configuration based on the received beacon signal being associated with one or more of at least one subset of resource elements of the set of resource elements, at least one angle of the set of multiple angles associated with the wireless communication, or at least one power signature identifier of the set of power signature identifiers, generate a first preamble based on the determined preamble configuration, and transmit the first preamble based on the generating.

Another apparatus for wireless communication at a first device is described. The apparatus may include means for receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers, means for receiving, from the second device, a beacon signal, means for determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers, means for generating a first preamble based on the determined preamble configuration, and means for transmitting the first preamble based on the generating.

A non-transitory computer-readable medium storing code for wireless communication at a first device is described. The code may include instructions executable by a processor to receive, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers, receive, from the second device, a beacon signal, determine a preamble configuration based on the received beacon signal being associated with one or more of at least one subset of resource elements of the set of resource elements, at least one angle of the set of multiple angles associated with the wireless communication, or at least one power signature identifier of the set of power signature identifiers, generate a first preamble based on the determined preamble configuration, and transmit the first preamble based on the generating.

Some examples of the method, apparatuses, and non-transitory computer-readable medium described herein may further include operations, features, means, or instructions for determining, based on the preamble configuration, one or more of a subcarrier spacing, a preamble duration, a transmit power level, or a cyclic shift value associated with the first preamble and where generating the first preamble may be based on one or more of the subcarrier spacing, the preamble duration, the transmit power level, or the cyclic shift value associated with the first preamble.

In some examples of the method, apparatuses, and non-transitory computer-readable medium described herein, the received beacon signal may be associated with an angle of the set of multiple angles associated with the wireless communication and determining the preamble configuration may be based on the angle associated with the wireless communication being greater than or equal to a threshold.

In some examples of the method, apparatuses, and non-transitory computer-readable medium described herein, the received beacon signal may be associated with a power signature identifier of the set of power signature identifiers and determining the preamble configuration may be based on the power signature identifier.

Some examples of the method, apparatuses, and non-transitory computer-readable medium described herein may further include operations, features, means, or instructions for multiplexing the first preamble with a second preamble associated with a third device based on a time-division multiplexing scheme, a frequency-division multiplexing scheme, or a code-division multiplexing scheme, the second preamble associated with a same preamble configuration as the first preamble and where transmitting the first preamble may be based on multiplexing the first preamble with the second preamble associated with the third device.

In some examples of the method, apparatuses, and non-transitory computer-readable medium described herein, the at least one subset of resource elements includes a subset of frequencies of a set of frequencies.

Some examples of the method, apparatuses, and non-transitory computer-readable medium described herein may further include operations, features, means, or instructions for receiving an indication including multiple sets of parameters, where each set of parameters corresponds to the at least one power signature identifier of the set of power signature identifiers.

Some examples of the method, apparatuses, and non-transitory computer-readable medium described herein may further include operations, features, means, or instructions for receiving at least one of system information, a radio resource control (RRC) configuration message, or a synchronization signal bock (SSB)-based configuration including the indication including the multiple sets of parameters and where determining the set of resource elements may be based on receiving at least one of the system information, the RRC configuration message, or the SSB-based configuration including the indication including the multiple sets of parameters.

A method for wireless communication at a first device is described. The method may include receiving, from a second device, control signaling indicating a timing configuration identifying a set of beacon occasions, each beacon occasion of the set of beacon occasions including a set of resource elements, receiving, from the second device, a beacon signal during a beacon occasion of the set of beacon occasions and on a subset of resource elements of the set of resource elements associated with the beacon occasion, the subset of resource elements corresponding to an identifier of the second device, and transmitting a report including an indication of the subset of resource elements associated with the received beacon signal.

An apparatus for wireless communication at a first device is described. The apparatus may include a processor, memory coupled with the processor, and instructions stored in the memory. The instructions may be executable by the processor to cause the apparatus to receive, from a second device, control signaling indicating a timing configuration identifying a set of beacon occasions, each beacon occasion of the set of beacon occasions including a set of resource elements, receive, from the second device, a beacon signal during a beacon occasion of the set of beacon occasions and on a subset of resource elements of the set of resource elements associated with the beacon occasion, the subset of resource elements corresponding to an identifier of the second device, and transmit a report including an indication of the subset of resource elements associated with the received beacon signal.

Another apparatus for wireless communication at a first device is described. The apparatus may include means for receiving, from a second device, control signaling indicating a timing configuration identifying a set of beacon occasions, each beacon occasion of the set of beacon occasions including a set of resource elements, means for receiving, from the second device, a beacon signal during a beacon occasion of the set of beacon occasions and on a subset of resource elements of the set of resource elements associated with the beacon occasion, the subset of resource elements corresponding to an identifier of the second device, and means for transmitting a report including an indication of the subset of resource elements associated with the received beacon signal.

A non-transitory computer-readable medium storing code for wireless communication at a first device is described. The code may include instructions executable by a processor to receive, from a second device, control signaling indicating a timing configuration identifying a set of beacon occasions, each beacon occasion of the set of beacon occasions including a set of resource elements, receive, from the second device, a beacon signal during a beacon occasion of the set of beacon occasions and on a subset of resource elements of the set of resource elements associated with the beacon occasion, the subset of resource elements corresponding to an identifier of the second device, and transmit a report including an indication of the subset of resource elements associated with the received beacon signal.

Some examples of the method, apparatuses, and non-transitory computer-readable medium described herein may further include operations, features, means, or instructions for demultiplexing the beacon signal based on one or more of a time-division demultiplexing scheme or a frequency-division demultiplexing scheme, the beacon signal multiplexed with another beacon signal associated with the second device and where receiving the beacon signal may be based on demultiplexing the beacon signal.

Some examples of the method, apparatuses, and non-transitory computer-readable medium described herein may further include operations, features, means, or instructions for determining a symbol index associated with the subset of resource elements of the set of resource elements associated with the beacon occasion and where the report includes an indication of the symbol index associated with the subset of resource elements of the set of resource elements associated with the beacon occasion.

Some examples of the method, apparatuses, and non-transitory computer-readable medium described herein may further include operations, features, means, or instructions for determining a resource element group index associated with the subset of resource elements of the set of resource elements associated with the beacon occasion and where the report includes an indication of the resource element group index associated with the subset of resource elements of the set of resource elements associated with the beacon occasion.

In some examples of the method, apparatuses, and non-transitory computer-readable medium described herein, the second device includes a network entity.

In some examples of the method, apparatuses, and non-transitory computer-readable medium described herein, receiving the control signaling indicating the timing configuration may include operations, features, means, or instructions for receiving the control signaling indicating the timing configuration from the second device, where the timing configuration may be configured by the second device or a centralized unit of the second device.

A method for wireless communication at a first device is described. The method may include receiving a beacon signal, from a second device, the received beacon signal associated with a subset of resource elements of a set of resource elements, transmitting a preamble based on the received beacon signal, the preamble including a request for cell information associated with the received beacon signal, receiving the cell information based on the transmitted preamble, and establishing a communication link between the first device and the second device based on the received cell information.

An apparatus for wireless communication at a first device is described. The apparatus may include a processor, memory coupled with the processor, and instructions stored in the memory. The instructions may be executable by the processor to cause the apparatus to receive a beacon signal, from a second device, the received beacon signal associated with a subset of resource elements of a set of resource elements, transmit a preamble based on the received beacon signal, the preamble including a request for cell information associated with the received beacon signal, receive the cell information based on the transmitted preamble, and establish a communication link between the first device and the second device based on the received cell information.

Another apparatus for wireless communication at a first device is described. The apparatus may include means for receiving a beacon signal, from a second device, the received beacon signal associated with a subset of resource elements of a set of resource elements, means for transmitting a preamble based on the received beacon signal, the preamble including a request for cell information associated with the received beacon signal, means for receiving the cell information based on the transmitted preamble, and means for establishing a communication link between the first device and the second device based on the received cell information.

A non-transitory computer-readable medium storing code for wireless communication at a first device is described. The code may include instructions executable by a processor to receive a beacon signal, from a second device, the received beacon signal associated with a subset of resource elements of a set of resource elements, transmit a preamble based on the received beacon signal, the preamble including a request for cell information associated with the received beacon signal, receive the cell information based on the transmitted preamble, and establish a communication link between the first device and the second device based on the received cell information.

Some examples of the method, apparatuses, and non-transitory computer-readable medium described herein may further include operations, features, means, or instructions for determining an offset between a first symbol associated with the beacon signal and a second symbol associated with a preamble occasion and where transmitting the preamble may be based on determining the offset between the first symbol associated with the beacon signal and the second symbol associated with the preamble occasion.

In some examples of the method, apparatuses, and non-transitory computer-readable medium described herein, the preamble occupies a second subset of resource elements of the set of resource elements, the second subset of resource elements associated with a narrowband.

Some examples of the method, apparatuses, and non-transitory computer-readable medium described herein may further include operations, features, means, or instructions for receiving at least one of an SSB, a master information block (MIB), or a system information block (SIB) including the cell information and where establishing the communication link between the first device and the second device may be based on receiving the at least one of the SSB, the MIB, or the SIB including the cell information.

Some examples of the method, apparatuses, and non-transitory computer-readable medium described herein may further include operations, features, means, or instructions for establishing the communication link between the first device and the second device based on a radio network temporary identifier (RNTI) of a set of predetermined RNTIs based on the cell information.

In some examples of the method, apparatuses, and non-transitory computer-readable medium described herein, the RNTI may be based on one or more of a beacon occasion associated with the beacon signal or a preamble occasion associated with the preamble.

DETAILED DESCRIPTION

Figure 1:
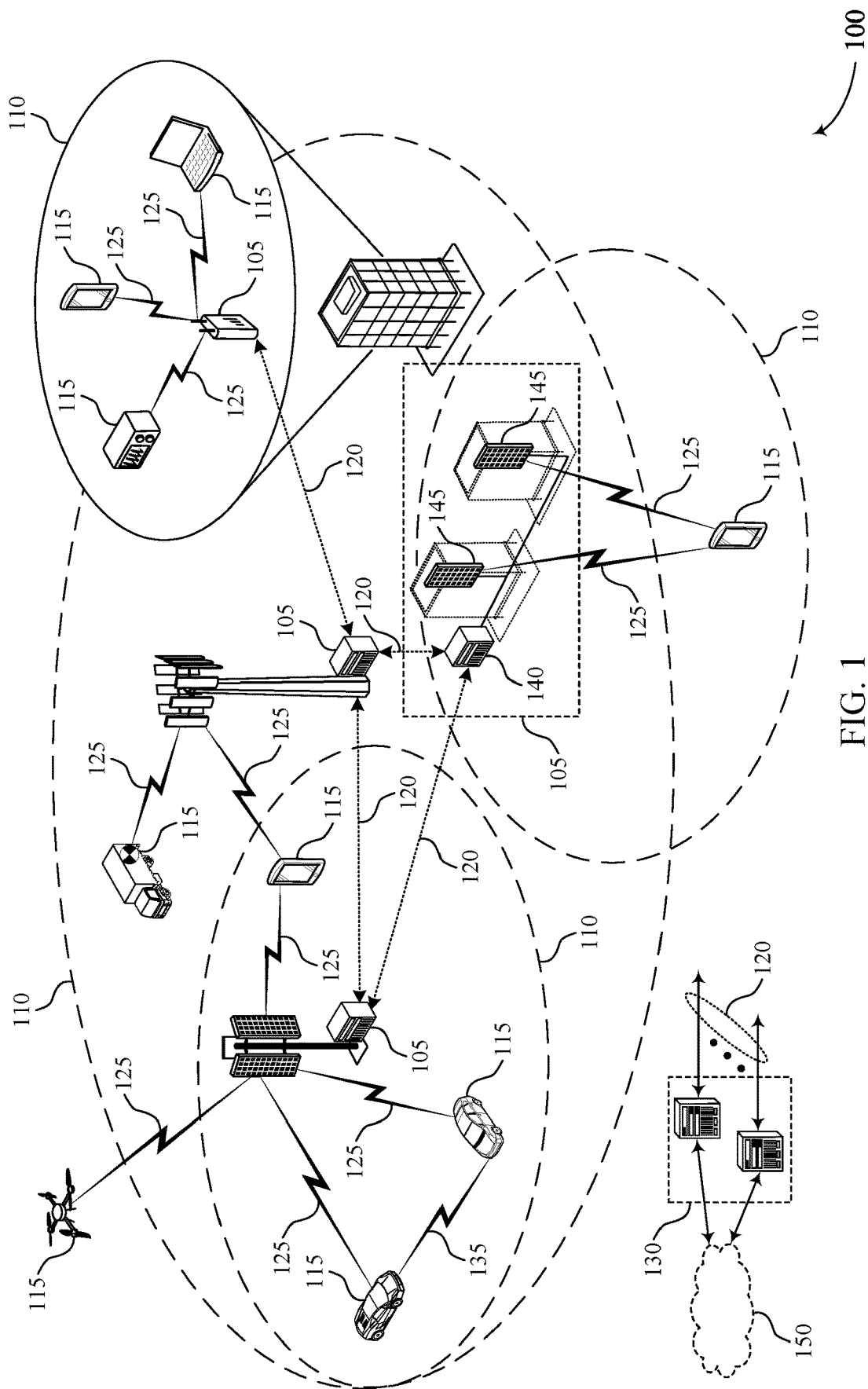
FIGS. 1 and 2 illustrate examples of wireless communications systems that support link establishment using leaky-wave antennas in accordance with aspects of the present disclosure.

A wireless communications system may support both access links and sidelinks for communications between communication devices. An access link may refer to a communication link between a UE and a base station (e.g., via a Uu interface in an NR system). For example, an access link may support uplink signaling, downlink signaling, connection procedures, among other examples. A sidelink may refer to a communication link between similar communication devices (e.g., a communication link between UEs via a PC5 interface, or a backhaul communication link between base stations such as an integrated access and backhaul (IAB) communication link). In some examples, a sidelink may support device-to-device (D2D) communication, vehicle-to-everything (V2X), cellular V2X (C-V2X), or vehicle-to-vehicle (V2V) communication, proximity-based services (ProSe) communication, PC5 communication, IAB communication, message relaying, discovery signaling, beacon signaling, or any combination of these or other signals transmitted over-the-air from between communication devices. It is noted that the various examples provided herein may be used for any type of wireless communications devices (e.g., UEs or base stations) that use sidelink or access link communications.

A communication device (e.g., a base station or a UE) may transmit signals directly to another communication device (e.g., another base station or another UE), for example using beamforming. The communication device may support beamforming operations such as frequency-domain beam sweeping. In some cases, frequency-domain beam sweeping may be used for an initial cell search or for establishing a communication link. In some examples, frequency-domain beam sweeping may be performed using a true-time delay analog array. For example, in an analog beamforming array, a signal may be transmitted from array elements with different beamforming weights $\{w_i\}$. In the absence of frequency selectivity of a wireless channel, the received signal at a communication device (e.g., a UE) may be flat in frequency.

A true-time delay analog array architecture may be used where different time-delays may be added to beamforming weights $\{w_i\}$. As such, beamforming may be frequency selective in different directions. For example, one fraction of the frequency components of the signal may be pointing at one direction and another fraction of the frequency components of the signal may be pointing at a different direction. In some cases, measurements may be reported by the communication device (e.g., a receiving device) where another communication device (e.g., a transmitting device) uses frequency-domain beam sweeping. In some other examples, frequency-domain beam sweeping may be performed using a slotted waveguide (e.g., a leaky-wave antenna). For example, a communication device may support wireless communications using a leaky-wave antenna. In some cases, wireless communications (e.g., signals) propagating through a leaky-wave antenna may experience different propagation channels such that an angle of emission (e.g., an angle at which a signal leaks into free space) may be coupled to the frequency of the wireless communications (e.g., signals).

A communication device may inject a wideband signal into a leaky-wave antenna to generate multiple beams and provide coverage over a wide angular region. The direction in which beams emit from the leaky-wave antenna may be coupled to the frequency components of the beam. As such, each generated beam may correspond to a different portion of the frequency components (e.g., a different portion of the carriers or subcarriers) included in the wideband signal. For example, beams with high frequency components may emit from a leaky-wave antenna at small angles (e.g., angles below a threshold) and beams with low frequency components may emit at large angles (e.g., angles above a threshold). For instance, beams corresponding to a subcarrier around 800 GHz may emit from a leaky-wave antenna at angles around 10 degrees measured from the axis of the leaky-wave antenna and beams corresponding to a subcarrier around 150 GHz may emit from the leak-wave antenna at angles around 80 degrees measured from the axis of the leaky-wave antenna. In some cases, each beam emitted from the leaky-wave antenna may have a spectral signature (e.g., a system response) with a peak amplitude that occurs at a frequency which is coupled to the angle at which the beam was emitted.

In some cases, a communication device may perform a beam sweeping operation (e.g., beam training) to conduct directional communications with another communication device. In some cases, beam training operations may be lengthy while having high signaling overhead. To reduce signaling overhead, and increase efficiency, a communication device may perform rainbow beamforming by transmitting a beacon signal to another communication device via a leaky-wave antenna. In some cases, the angle in which beams emit from a leaky-wave antenna may be coupled to the frequency components of the beam. Therefore, each generated beam may correspond to a different portion of the frequency components included in the wideband signal. This may cause the angle-frequency coupling of a leaky-wave antenna to be non-linear and, as a result, the spectral signature of beams emitted at high angles (e.g., greater than 50 degrees) may vary less with angle than signals emitted at lower angles. As such, the spectral signature of different low frequency beams may be indistinguishable to a receiving device.

A communication device may transmit a preamble in response to detecting a beacon signal. For example, a communication device may generate a preamble based on the resource elements occupied by the detected beacon signal. In some cases, if a communication device detects a beacon signal at higher frequencies, the communication device may generate a short preamble. For instance, a short preamble may be generated with a large subcarrier spacing (e.g., with a wider bandwidth) and a short time duration. In some other cases, if a communication device detects a beacon signal at higher frequencies, the communication device may generate a long preamble. For instances, a long preamble may be generated with short subcarrier spacing (e.g., with a shorter bandwidth) and a long time duration. In another example, a communication device may alter the length of a preamble using different cyclic shift values.

The communication device may determine resources for transmitting a preamble based on the spectral signature of a detected beacon. For example, a communication device may be configured to map the spectral signature (e.g., or angle of departure) of a received beacon signal to a preamble transmission occasion. In some cases, a receiving device may determine the identity of the transmitting device based on the resources occupied by the detected beacon signal. For example, different communication devices may be configured to transmit a beacon signal during a certain time interval and, therefore, the receiving device may determine the identity of the transmitting device based on the time in which the beacon is received. In some examples, a communication device may, in response to detecting a beacon signal, transmit a preamble which may include information regarding the resources occupied by the detected beacon signal. In some cases, the preamble may indicate a request for more information regarding the identity of the communication device which transmitted the beacon signal.

Aspects of the subject matter described herein may be implemented to realize one or more advantages. The described techniques may support improvements in wireless communications systems by reducing signaling overhead related to beamforming processes and may improve wireless communication between communication devices. In some examples, link establishment using leaky-wave antennas, as described herein, may support higher data rates, thereby improving latency and reliability. As such, supported techniques may include improved network operations, and, in some examples, may promote network efficiencies, among other benefits.

Aspects of the disclosure are initially described in the context of wireless communications systems. Aspects of the disclosure are further illustrated by and described with reference to apparatus diagrams, system diagrams, and flowcharts that relate to link establishment using leaky-wave antennas.

FIG. 1 illustrates an example of a wireless communications system 100 that supports link establishment using leaky-wave antennas in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information (SI)), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

A UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the communication device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support one or more aspects of link establishment using leaky-wave antennas. For example, a communication device (e.g., a UE 115 or a base station 105) may receive a control signal that may indicate a plurality of preamble configurations. In some cases, in response to receiving a beacon signal, the communication device may transmit a preamble based on an indicated preamble configuration. The received beacon signal may be associated with at least one power signature identifier. In some cases, the communication device may determine a set of resource elements based on the at least one power signature and may transmit the preamble based on the determined set of resources elements. In some examples, the communication device may receive a beacon signal during a beacon occasion and on a subset of resource elements that may correspond to an identifier of another communication device (e.g., one or more other UEs 115 or one or more other base stations 105). In some cases, in response to receiving the beacon signal, the communication device may transmit a report including an indication of the subset of resource elements. In some examples, the communication device may transmit a preamble that may include a request for cell information associated with a received beacon signal.

Figure 2:
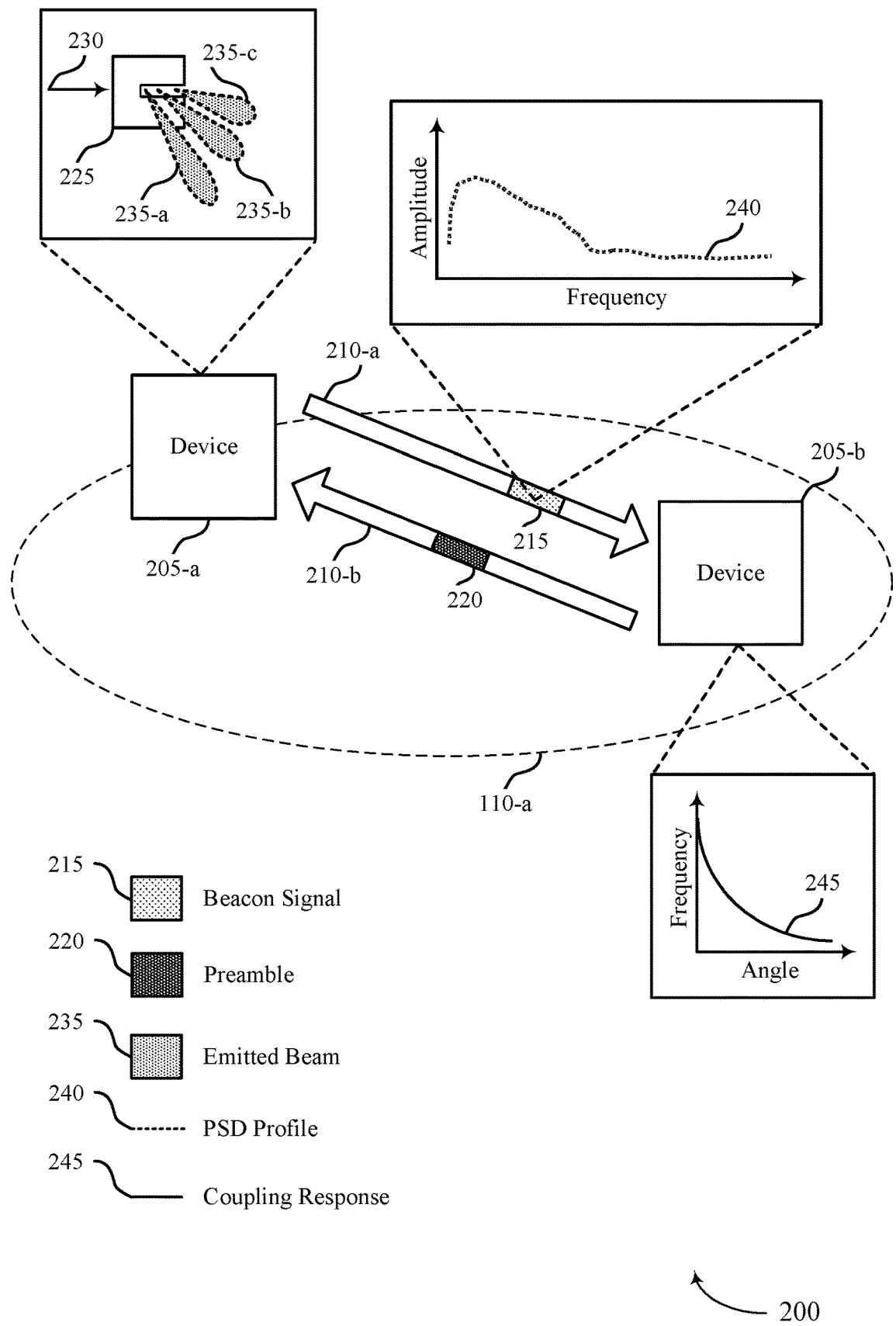

FIG. 2 illustrates an example of a wireless communications system 200 that supports link establishment using leaky-wave antennas in accordance with aspects of the present disclosure. The wireless communications system 200 may implement or be implemented by one or more aspects of the wireless communications system 100. For example, the wireless communications system 200 may include a device 205-*a* and a device 205-*b*, which may be examples of devices as discussed with reference to FIG. 1. In the example of FIG. 2, the device 205-*a* may be a transmitting communication device (e.g., a base station 105 or a UE 115), while the device 205-*b* may be a receiving communication device (e.g., a base station 105 or a UE 115). The device 205-*a* and the device 205-*b* may support wired or wireless communication within a geographic coverage area 110-*a* which may be an example of a geographic coverage area 110 described with reference to FIG. 1.

The device 205-*a* may transmit one or more signals to the device 205-*b* via a communication link 210-*a* and the device 205-*b* may transmit one or more signals to the device 205-*a* via a communication link 210-*b*. The communication links 210 may be examples of an access link, a sidelink, or a wireless backhaul link. In some examples, the devices 205 may communicate with one or more other devices 205 via one or more other communication links. The wireless communications system 200 may support link establishment using leaky-wave antennas. For example, one or more of the device 205-*a* or the device 205-*b* may transmit one or more signals using a leaky-wave antenna.

In some cases, a leaky-wave antenna may be an example of a waveguide (e.g., a slotted waveguide) with a narrow slot open on one side of the waveguide. In some examples, a slotted waveguide may be an apparatus, which includes parallel plates (e.g., metal plates) separated by a distance and a narrow slot (e.g., opening) that extends from one side of one plate. Traveling waves may leak energy out into a medium (e.g., free space) and different frequency components may emit at different angles (e.g., higher frequencies may emit at smaller angles). As such, wave propagating through a leaky-wave antenna may experience different propagation channels such that the angle of emission may be coupled to the frequency of the signal. In some cases, signals (e.g., beams) may emit from a leaky-wave antenna according to an angle-frequency coupling response, such as a coupling response 245. As such, higher frequency waves (e.g., signals around 800 GHz) may emit at smaller angles (e.g., angles around 10 degrees measured from the axis of the leaky-wave antenna) and lower frequency waves (e.g., signals around 150 GHz) may emit at larger angles (e.g., angles around 80 degrees measured from the axis of the leaky-wave antenna). In some examples, leaky-wave antennas may be used for directional beamforming. Beamforming via a leaky-wave antenna may be referred to as rainbow beamforming and the multiple emitted beams may be collectively referred to as a rainbow beam.

In some cases, a leaky-wave antenna (e.g., or a true-time-delay analog array) may be used for a link establishment procedure. For example, a transmitting node (e.g., transmitting device) may perform a frequency-domain beam sweeping procedure by transmitting (e.g., via a leaky-wave antenna) a wideband signal such that different frequency components of the signal may be focused on different angular regions. In response to detecting a signal, the receiving node (e.g., receiving device) may transmit a preamble (e.g., a random access channel (RACH) message) based on the frequency-domain resources in which the signal was detected. In some cases, the resources of the detected beacon signal may be mapped (e.g., in the time-domain or the frequency-domain) to resources for transmitting a preamble. For example, the location (e.g., angular region) in which a preamble (e.g., an uplink preamble) is sent may carry information regarding the frequency domain resources in which the corresponding beacon signal was detected. In some cases, the preamble may carry information regarding the angle of departure of the detected signal and the associated transmitting device.

In some examples of frequency-domain beam sweeping via a leaky-wave antenna, a rainbow beam may be created in a one-shot transmission. In such cases, a large spatial area may be covered with different portions of the wideband signal. For example, one or more of the device 205-*a* or the device 205-*b* may inject a wideband signal (e.g., a wideband signal 230) into a leaky-wave antenna (e.g., a leaky-wave antenna 225) to transmit multiple beams that cover a large spatial area. That is, a broadband source may generate a terahertz (THz) pulse which may be injected into the leaky-wave antenna. In some cases, the THz pulse may be a beacon signal that may not carry information. In some cases, the emitted beams (e.g., an emitted beam 235-*a*, an emitted beam 235-*b*, and an emitted beam 235-*c*) may each correspond to a different portion of frequency components included in the wideband signal 230. For example, the emitted beam 235-*a* may correspond to low frequency components and the emitted beam 235-*c* may correspond to high frequency components. In some cases, the angle-frequency coupling of a leaky-wave antenna may be non-linear and, as a result, the spectral signature of beams emitted at high angles (e.g., greater than 50 degrees) may vary less with angle than signals emitted at lower angles. As such, the spectral signature of different low frequency beams may be indistinguishable to a receiving device. In such cases, if a beacon signal does not carry information, for example an identifier, it may be difficult for a searching (e.g., receiving) device to distinguishing between the multiple devices using leaky-wave antenna for link establishment procedure.

Additionally, in some cases, the effective half-power angular width (e.g., the angular width of the beam at half the peak power) and the effective half-power bandwidth (e.g., the frequency bandwidth of the beam at half the peak power) of emitted beams may depend on the angle at which each beam is emitted (e.g., the angle of departure). In some cases, the half-power bandwidth may also depend on the slot width of the leaky-wave antenna. In some examples, one or more of the device 205-*a* or the device 205-*b* may detect different spectral signatures (e.g., different power spectral density profiles 240) based on the angular region in which one or more of the device 205-*a* or the device 205-*b* is located (e.g., relative to the leaky-wave antenna). Stated alternatively, each angular region may correspond to a respective power spectral density profile 240 (e.g., a power spectral identifier). In some cases, the effective half-power bandwidth of beams emitted at large angles (e.g., angles greater than 50 degrees measured from the axis of the leaky-wave antenna) may be reduced compared to beams emitted at small angles. As such, the power spectral identifiers of beams emitted at large angles (e.g., beams including low frequency components) may be narrow relative to the power spectral identifiers of beams emitted at small angles (e.g., beams including high frequency components).

In some examples, to establish a link using leaky-wave antenna, a communication device (e.g., the device 205-*b*) may transmit (e.g., in response to a detected beacon) a preamble configured for a leaky-wave antenna system. For example, the device 205-*a* may transmit a beacon signal 215 to the device 205-*b* via the communication link 210-*a*. In response to receiving the beacon signal 215, the device 205-*b* may transmit a preamble 220. In some cases, the device 205-*b* may receive a control signal (not shown) that may indicate a plurality of preamble configurations. In some cases, the device 205-b may transmit the preamble 220 based on an indicated preamble configuration (e.g., of the plurality of preamble configurations). In some examples, the beacon signal 215 may be associated with one or more spectral signatures (e.g., power signature identifiers) and the device 205-b may determine a set of resource elements based on the one or more power signature. In such cases, the device 205-b may transmit the preamble 220 based on the determined set of resources elements.

A communication device may identify a device through wide-band beacons (e.g., beacons transmitted using leaky-wave antennas). For example, the device 205-b may receive the beacon signal 215 during a beacon occasion and on a subset of resource elements. In some cases, the subset of resource elements may correspond to an identifier of the device 205-a. In some examples, in response to receiving the beacon signal, the device 205-b may transmit a report (not shown) including an indication of the subset of resource elements. In some other examples, the device 205-b may include (e.g., in the preamble 220) a request for cell information associated with the beacon signal 215.

The wireless communications system 200 may support link establishment and beam training operations performed using leaky-wave antennas to reduce signaling overhead. As such, link establishment using leaky-wave antennas may increase the efficiency of communications between the devices 205 in the wireless communications system 200, among other benefits.

Figure 3:
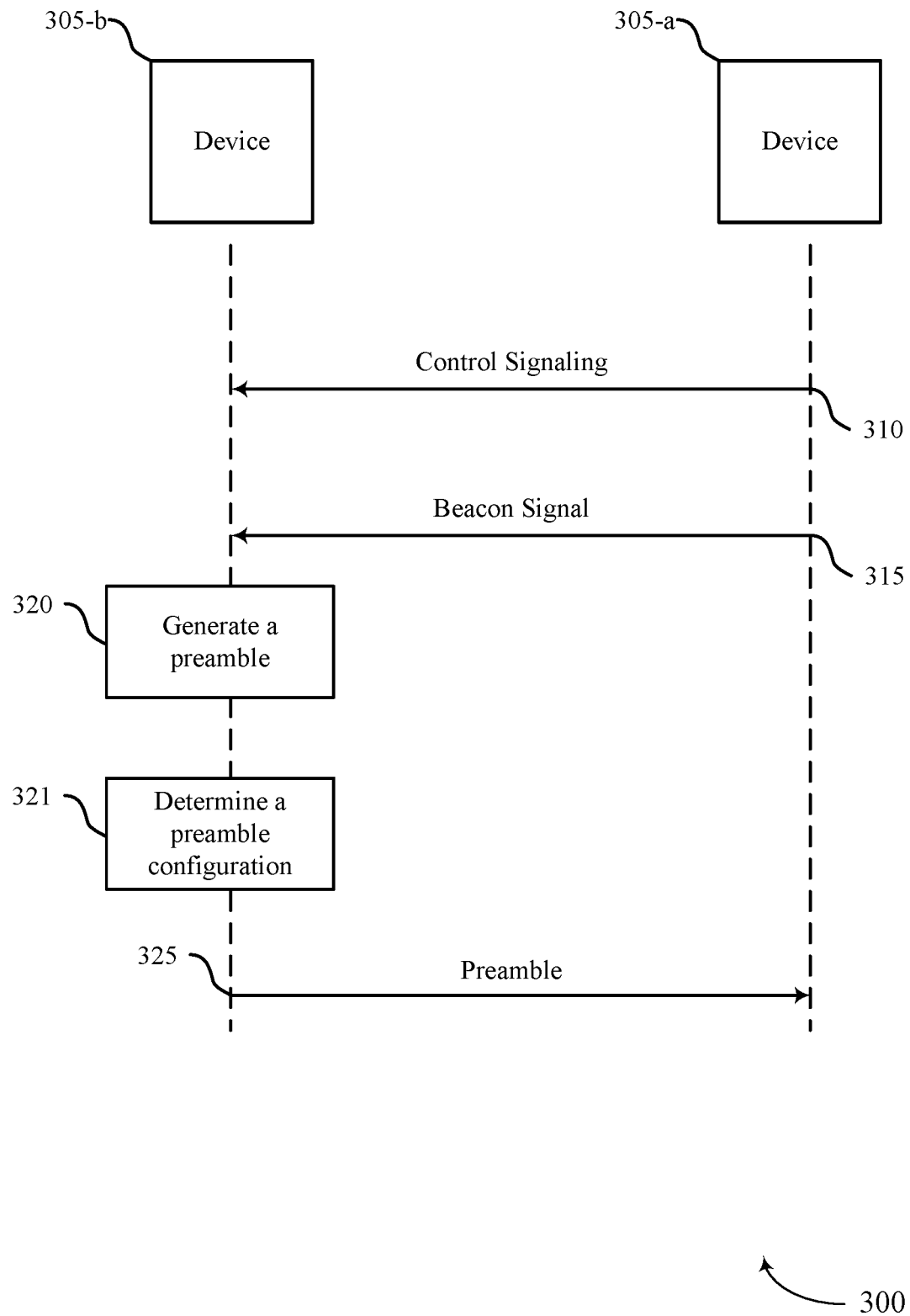
FIGS. 3 through 6 each illustrate examples of process flows that support link establishment using leaky-wave antennas in accordance with aspects of the present disclosure.

FIG. 3 illustrates an example of a process flow 300 that supports link establishment using leaky-wave antennas in accordance with aspects of the present disclosure. The process flow 300 may implement or be implemented by one or more aspects of the wireless communications system 100 and the wireless communications system 200. For example, the process flow 300 may be implemented by a device 305-a and a device 305-b, which may be examples of devices as discussed with reference to FIG. 1. In the example of FIG. 3, the device 305-a may be a transmitting communication device (e.g., a base station 105 or a UE 115), while the device 305-b may be a receiving communication device (e.g., a base station 105 or a UE 115). In the following description of the process flow 300, operations between the device 305-a and the device 305-b may occur in a different order or at different times than as shown. Some operations may also be omitted from the process flow 300, and other operations may be added to the process flow 300.

At 310, the device 305-b may receive a control signal that indicates a plurality of preamble configurations. In some cases, each preamble configuration may correspond to a respective subset of resource elements. For example, the effective bandwidth and link budget may be different for different beacon signals (e.g., based the frequency or range of frequencies included in the beacon signal). In some cases, beacon signals with lower frequency components (e.g., beacon signals with larger angle of departures) may have a smaller effective half-power bandwidth than beacon signals with larger frequency components. As such, beacon signals with lower frequency components may have a reduced link budget and, therefore, detection at a receiving device (e.g., the device 305-b) may be low.

Additionally or alternatively, in some cases, the peak angle-frequency curve (e.g., the angle-frequency response) of a leaky-wave antenna may be flat (e.g., in frequency) for signals emitted at angles greater than 50 degree (e.g., low frequency signals). As such, the spectral signatures for low frequency signals may be indistinguishable to the device 305-b. Therefore, in some cases, a preamble configuration may be different for different angle of departures or different resource element groups. Stated alternatively, the preamble configuration used to generate a preamble (e.g., in response to receiving a beacon signal) may depend on the angle of departure of the detected beacon signal, or the resource elements occupied by the detected beacon signal.

For example, at 315, the device 305-b may receive a beacon signal from the device 305-a. At 320, in response to receiving a beacon signal, the device 305-b may generate a preamble. In some cases, the device 305-b may generate the preamble according to a configuration. In some cases, the configuration may depend on the angle of departure of the detected beacon signal, or the resource elements occupied by the detected beacon signal. For example, a preamble configuration may include a subcarrier spacing and a time duration which may depend on the angle of departure of the detected beacon signal, or the subset of resource elements occupied by the detected beacon signal. In some cases, for example if the beacon signal includes higher frequency components (e.g., beacon signals with smaller angle of departures), a shorter preamble may be sufficient to provide a suitable link budget. At 321, the device 305-b may then determine a preamble configuration based on the received beacon signal being associated with one or more of at least one subset of resource elements of the set of resource elements, at least one angle of the plurality of angles associated with the wireless communication, or at least one power signature identifier of the set of power signature identifiers.

In some cases, a leaky-wave antenna receiver (e.g., the device 305-b) may have a larger effective bandwidth at smaller angles. Stated alternatively, preambles transmitted at smaller angles may have larger effective bandwidths than preambles transmitted at large angles. Therefore, to multiplex short preambles transmitted by multiple devices (e.g., multiple devices 305), the short preambles may be configured with larger subcarrier spacing (e.g., larger bandwidth) and a shorter time duration. In such cases, multiple short preamble occasions (e.g., for multiple devices 305) may be multiplexed, for example, using time division multiplexing. In some other cases, multiple short preambles may be multiplexed using frequency division multiplexing or code-division multiplexing. In yet some other cases, multiple preambles may be generated with multiple different cyclic shift values. In some instances, a cyclic shift value may be based on the subset of resource elements occupied by the detected beacon signal.

In some other examples, beacon signals that includes lower frequency components (e.g., beacon signals with large angle of departures) may have a higher link budget than beacon signals with higher frequency components. In such cases, longer preambles (e.g., preambles that are wider in the frequency domain) may have a lower detection probability at the receiving device. Therefore, in some cases, the device 305-a may be configured to transmit shorter preambles at a higher transmit power (e.g., with a higher target receive power for the corresponding transmission occasions). In some other cases, the device 305-a may be configured to transmit preambles with a smaller subcarrier spacing such that the preambles are longer in the time domain and narrower in frequency-domain.

Additionally or alternatively, due to the flat angle-frequency response of leaky-wave antennas at larger angle of departures, more angles may be mapped to the same resource element group and, as such, channel contention may be higher. In some cases, to reduce channel contention, beacon signals transmitted at larger angles may provide one-to-many mapping for time division multiplexing occasions. Stated alternatively, in areas with increased contention (e.g., areas covered by beacon signals with low frequency components) received beacon signals may map to multiple preamble occasions (e.g., occasions for transmitting a preamble). At 325, the device 305-b may transmit a generated preamble to the device 305-a.

Figure 4:
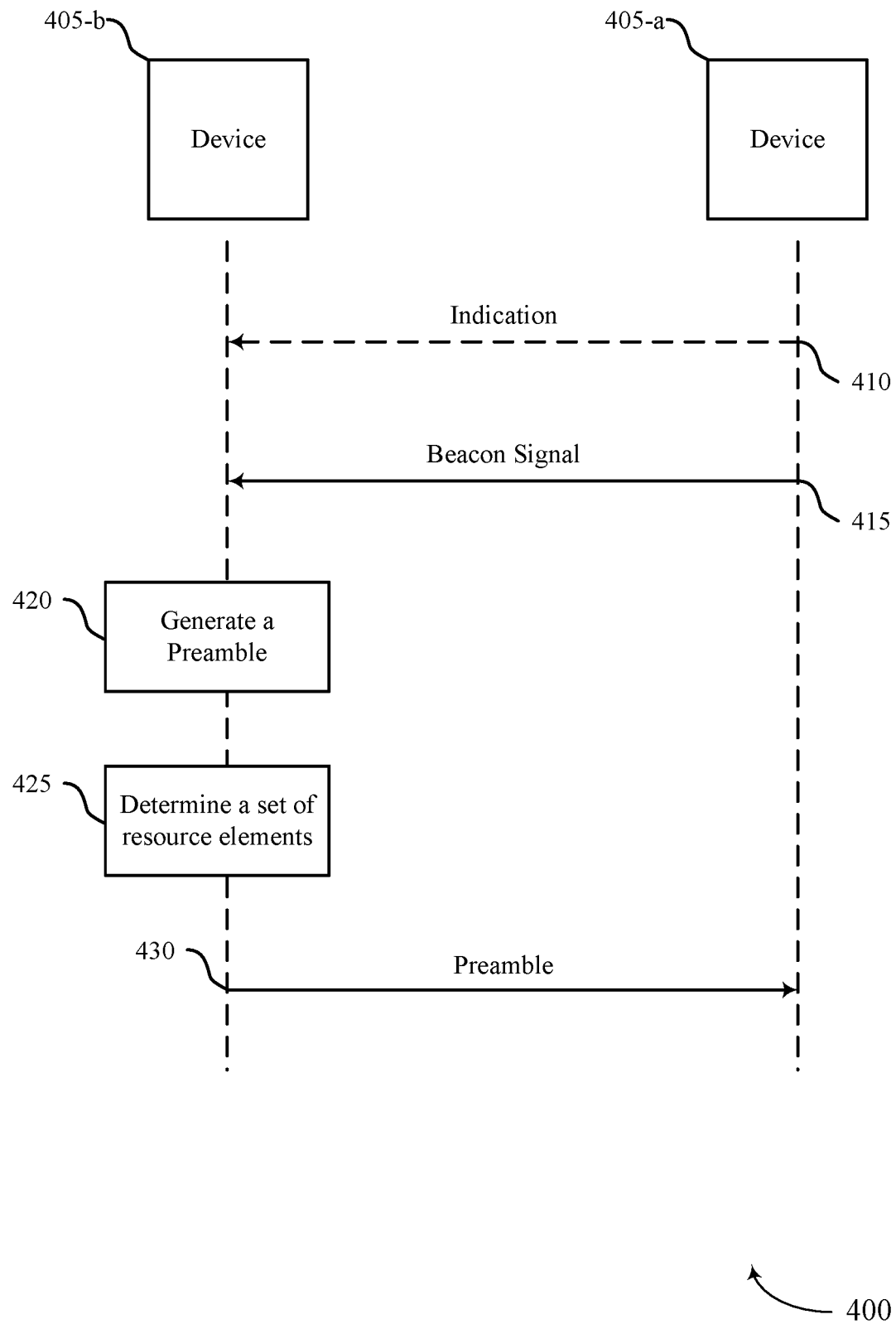

FIG. 4 illustrates an example of a process flow 400 that supports link establishment using leaky-wave antennas in accordance with aspects of the present disclosure. The process flow 400 may implement or be implemented by one or more aspects of the wireless communications system 100 and the wireless communications system 200. For example, the process flow 400 may include a device 405-a and a device 405-b, which may be examples of devices as discussed with reference to FIG. 1. In the example of FIG. 4, the device 405-a may be a transmitting communication device (e.g., a base station 105 or a UE 115), while the device 405-b may be a receiving communication device (e.g., a base station 105 or a UE 115). In the following description of the process flow 400, operations between the device 405-a and the device 405-b may occur in a different order or at different times than as shown. Some operations may also be omitted from the process flow 400, and other operations may be added to the process flow 400.

At 415, the device 405-b may receive a beacon signal from the device 405-a. The beacon signal may be associated with one or more spectral signatures (e.g., power signature identifiers) of a set of power signature identifiers. In some cases, the device 405-b may be configured with multiple sets of power signature identifiers. At 420, in response to receiving a beacon signal, the device 405-b may generate a preamble. In some cases, the preamble may be generated according to a preamble configuration as described with reference to FIG. 3.

At 425, the device 405-b may determine a set of resource elements based on the one or more power signature identifiers associated with the received beacon signal. In some cases, the received (e.g., detected) beacon signal may be mapped (e.g., in the time-domain or in the frequency-domain) to resources for transmitting a preamble (e.g., preamble occasions). For example, because different beacon signals may have different power signature identifiers (e.g., depending on the angle of departure of the beacon signal) the power signature identifier of a detected beacon signal may be mapped to the time-domain or frequency-domain resources in which the corresponding preamble may be transmitted. At 430 the device 405-b may transmit the generated preamble based on the determined set of resources.

One or more power spectral identifiers may be parametrized. For example, a power spectral identifier (e.g., the angle-frequency response of a leaky-wave antenna) may be described by the following angular distribution function:

$$G(\phi, f) = \mathrm{sinc}\left[(\beta - j\alpha - k_0\cos\phi)\frac{L}{2}\right],$$

where $$k_0 = \frac{2\pi f}{c} \text{ and } \beta = k_0\sqrt{1 - \left(\frac{c}{2bf}\right)^2}.$$

In such an example, f is the frequency of the input signals, c is the speed of light in free-space, b is the distance between the two plates of the leaky-wave antenna, and L is the aperture length. Various associated parameters to define the angular distribution function (e.g., as well as a one or more angle hypotheses) may be indicated to the device 405-b, based on the power spectral identifier being created (e.g., generated). For example, at 410, the device 405-b may receive an indication (e.g., from the device 405-a) including multiple sets of parameters. In some cases, each set of parameters may be associated with one or more power signature identifiers of the set of power signature identifiers. In some cases, the indication may be received via SI, an RRC message (e.g., a dedicated RRC), or a synchronization signal block (SSB) based measurement timing configuration (e.g., a SMTC).

Figure 5:
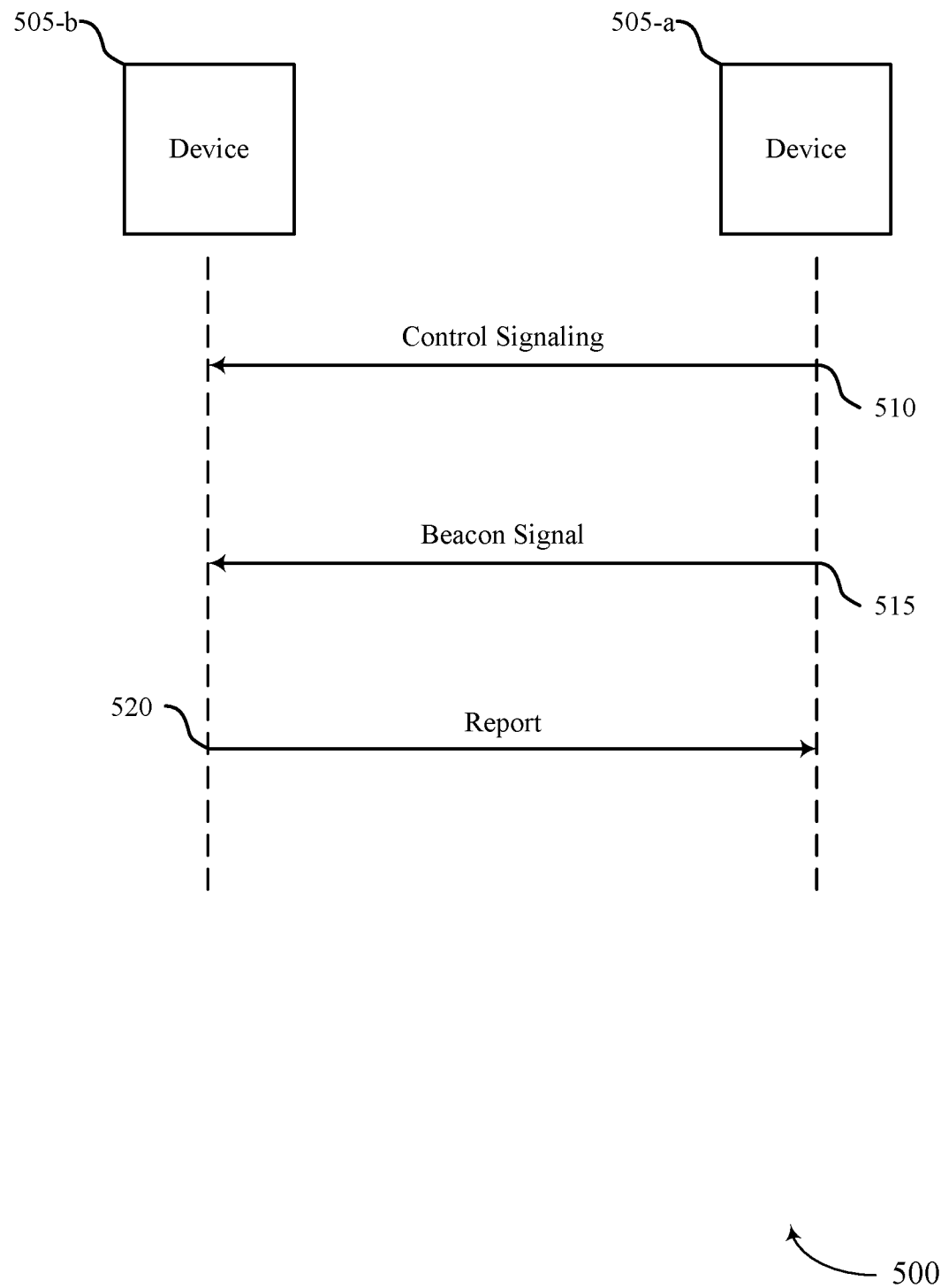

FIG. 5 illustrates an example of a process flow 500 that supports link establishment using leaky-wave antennas in accordance with aspects of the present disclosure. The process flow 500 may implement or be implemented by one or more aspects of the wireless communications system 100 and the wireless communications system 200. For example, the process flow 500 may include a device 505-a and a device 505-b, which may be examples of devices as discussed with reference to FIG. 1. In the example of FIG. 5, the device 505-a may be a transmitting communication device (e.g., a base station 105 or a UE 115), while the device 505-b may be a receiving communication device (e.g., a base station 105 or a UE 115). In the following description of the process flow 500, operations between the device 505-a and the device 505-b may occur in a different order or at different times than as shown. Some operations may also be omitted from the process flow 500, and other operations may be added to the process flow 500.

Time-division multiplexing may be used to transmit beacon signals from multiple different devices (e.g., devices 505). For example, different devices 505 may transmit beacon signals in different (e.g., separate) time resources. In some cases, because a single beacon signal may be sufficient to cover a large spatial area (e.g., an area spanning approximately 80 degrees measured from the axis of the transmitting device), a transmitting device (e.g., the device 505-a) may transmit beacon signals periodically and, in some cases, with an increased time gap. In such cases, synchronization may not be stringent (e.g., or depend on different real-time text (RTT) values at the monitoring device).

The device 505-a may coordinate with other transmitting devices (e.g., other device 505) to select (e.g., determine) resources for transmitting beacon signals. In some cases, a central entity (e.g., a centralized unit (CU) of a base station) may allocate resources (e.g., to one or more transmitting devices) for transmitting beacon signals. In some cases, the device 505-a and other transmitting devices may exchange configurations or perform a negotiation to determine resources for transmitting beacon signals. In some other cases, the device 505-a may determine resources for transmitting beacon signals based on monitoring for transmissions from nearby device. In such cases, the device 505-a may select resources that do not overlap with resources utilized by the other devices.

A searching device (e.g., the device 505-b) may be connected to the network, for example to perform radio resource management (RRM) measurements or while operating in non-standalone (NSA) mode. In such examples, the device 505-b may be provided (e.g., configured) with one or more resources to monitor or measure. For example, at 510, the device 505-b may receive control signaling from the device 505-*a*. In some cases, the control signaling may indicate a timing configuration identifying a set of beacon occasions. In some cases, each beacon occasion may include a set of resource elements.

At 515, the device 505-*b* may receive a beacon signal during a beacon occasion (e.g., of the set of beacon occasions) and on a subset of resource elements. In some cases, the subset of resource elements may correspond to an identifier of a transmitting device (e.g., the device 505-*a*). In some cases, in response to receiving the beacon signal, the device 505-*b* may report a detected beacon index in time (e.g., a symbol index) and in frequency (e.g., a resource element group index). For example, at 520, the device 505-*b* may transmit a report including an indication of the subset of resource elements associated with the received beacon signal. In some cases, the report may indicate a symbol index associated with the subset of resource elements, a resource element group index associated with the subset of resource elements, or a combination thereof.

Different devices may adopt different leaky-wave antenna confirmations, for example to create different power signature identifiers (e.g., through changes in the shape of the leaky-wave antenna). In such examples, detecting multiple overlapping spectral signature identifiers (e.g., based on power detection) may not be reliable and, therefore, orthogonalization of resources for transmitting beacon signals may be performed in the time-domain, frequency-domain, or spatial-domain.

Figure 6:
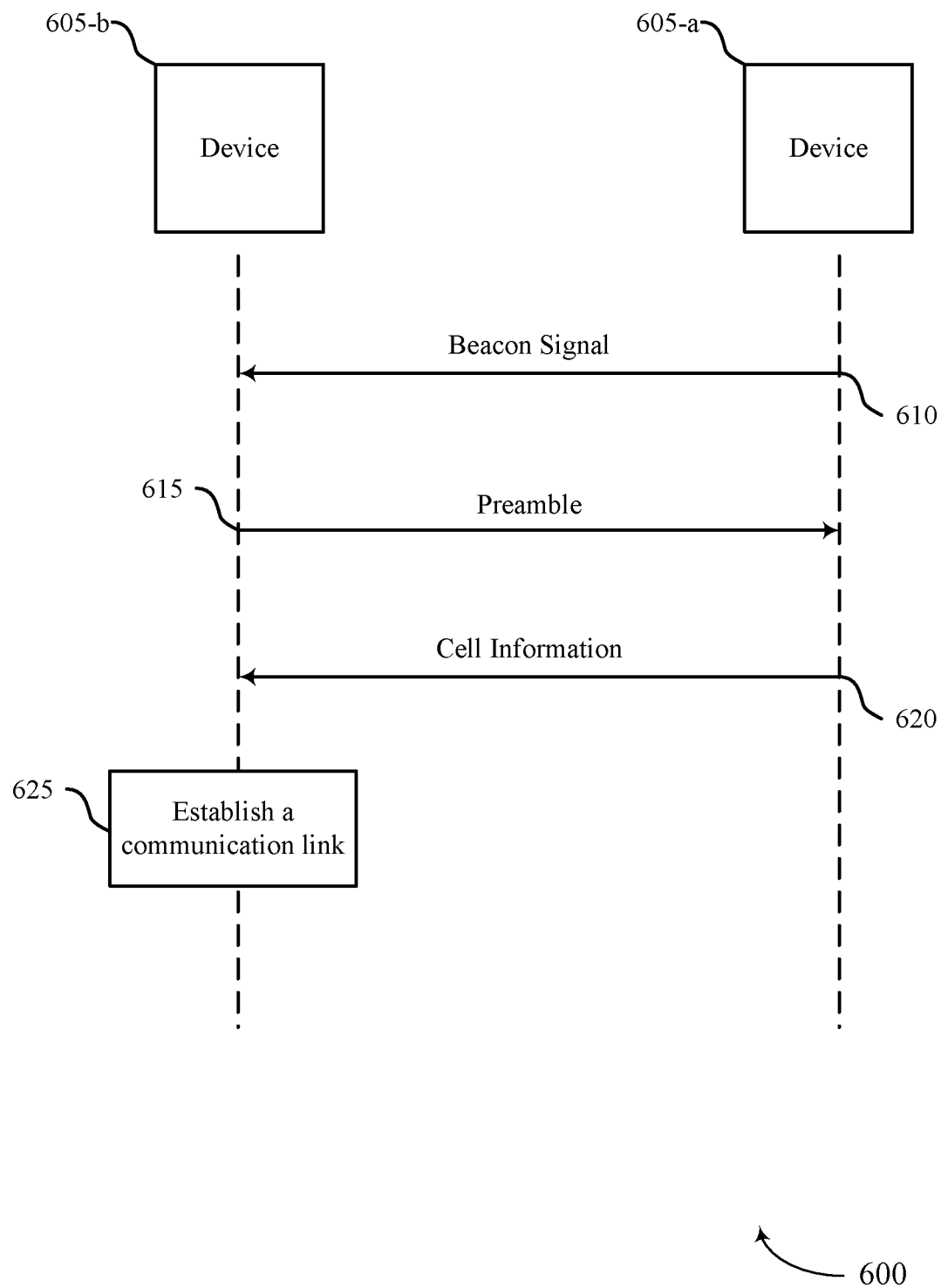

FIG. 6 illustrates an example of a process flow 600 that supports link establishment using leaky-wave antennas in accordance with aspects of the present disclosure. The process flow 600 may implement or be implemented by one or more aspects of the wireless communications system 100 and the wireless communications system 200. For example, the process flow 600 may include a device 605-*a* and a device 605-*b*, which may be examples of devices as discussed with reference to FIG. 1. In the example of FIG. 6, the device 605-*a* may be a transmitting communication device (e.g., a base station 105 or a UE 115), while the device 605-*b* may be a receiving communication device (e.g., a base station 105 or a UE 115). In the following description of the process flow 600, operations between the device 605-*a* and the device 605-*b* may occur in a different order or at different times than as shown. Some operations may also be omitted from the process flow 600, and other operations may be added to the process flow 600.

A searching device (e.g., the device 605-*b*) may be operating in a standalone mode (SA) and may perform an initial access procedure. For example, the device 605-*b* may search (e.g., monitor) different time and frequency locations to detect a beacon signal. At 610, the device 605-*b* may receive a beacon signal. Then, based on detecting a beacon signal, the device 605-*b* may transmit an uplink signal (e.g., a preamble described with reference to FIG. 3) to acquire more information. For example, at 615, the device 605-*b* may transmit a beacon signal to the device 605-*a*. In some cases, the preamble may include a request for cell information associated with the received beacon signal. In some instances, the device 505-*b* may transmit the preamble according to a preconfigured (e.g., and fixed) time offset between beacon symbols and preamble occasions. For example, the device 605-*b* may transmit the preamble based on identifying an uplink transmission occasion.

In some cases, the uplink transmission occasion may be based on a predetermined time offset measured from a symbol associated with the subset of resource elements occupied by the detected beacon signal. In some cases, the preamble may be a narrow band beacon (e.g., may be transmitted on a set of frequency resources associated with the subset of resource occupied by the detected beacon signal). In some other cases, the device 605-*b* may transmit the preamble using a single (e.g., omni-directional) beam, or a rainbow beam (e.g., via a leaky-wave antenna). In some cases, the device 605-*a* may monitor for the preamble using a THz rainbow receiver (e.g., one-shot receiver). In some other case, the device 605-*a* may monitor based on time-division multiplexed occasions. In such cases, the resource occupied by the detected beacon signal may be mapped to multiple preamble occasions (e.g., to be transmitted using time-division multiplexing).

In response to receiving a preamble, the device 605-*a* may transmit a signal (e.g., message) to the device 605-*b* to provide the device 605-*b* with more information. For example, at 620, the device 605-*b* may receive cell information based on the transmitted preamble. At 625, the device 605-*b* may establish a link with the device 605-*a* based on the received cell information. In some cases, the device 605-*b* may receive the cell information via an SSB, a MIB, or a SIB. In some cases, the device 605-*b* may monitor for a reference signal (e.g., primary synchronization signal (PSS) or a secondary synchronization signal (SSS) or a downlink channel communication (e.g., a broadcast channel communication, a control channel communication, or a data channel communication) on some time and frequency resources associated with the selected preamble occasion or the detected beacon signal. In some cases, the downlink channel communication may carry a SIB or a MIB.

In some cases, a reference signal may not be sent and, as such, the device 605-*b* may not receive a cell identifier of the transmitting device. In such cases, for example, a predetermined (e.g., fixed) radio network temporary identifier (RNTI) may be used to transmit the downlink channel communication. In another example, the RNTI may depend on the occasion on which the beacon signal was detected or the occasion in which the preamble was sent. In some cases, a broadcast channel message or a downlink control information (DCI) may carry a cell identifier of the transmitting device.

Figure 7:
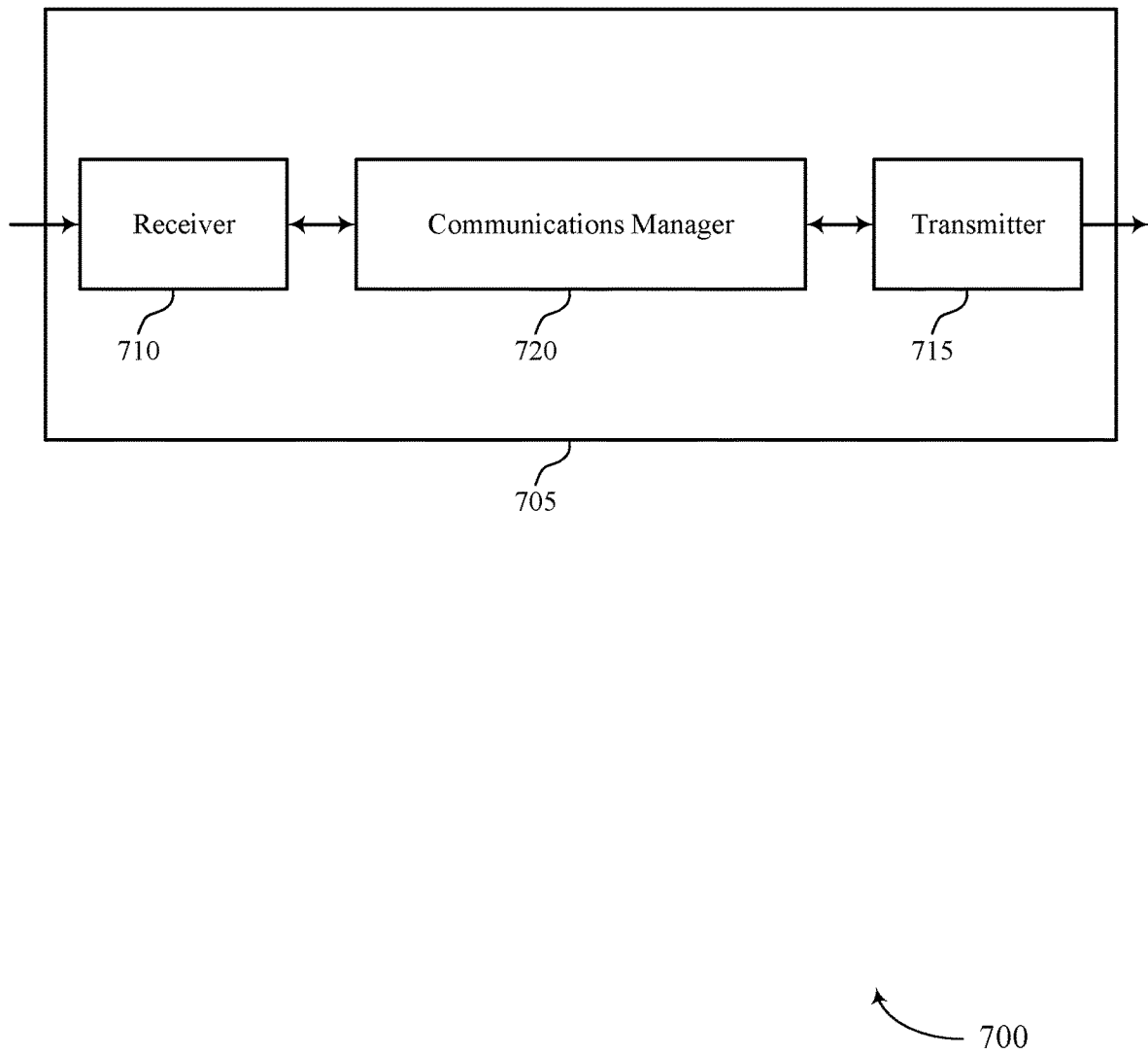
FIGS. 7 and 8 show block diagrams of devices that support link establishment using leaky-wave antennas in accordance with aspects of the present disclosure.

FIG. 7 shows a block diagram 700 of a device 705 that supports link establishment using leaky-wave antennas in accordance with aspects of the present disclosure. The device 705 may be an example of aspects of a base station or a UE as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to link establishment using leaky-wave antennas). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to link establishment using leaky-wave antennas). In some examples, the transmitter 715 may be co-located with a receiver 710 in a transceiver. The transmitter 715 may utilize a single antenna or a set of multiple antennas.

The communications manager 720, the receiver 710, the transmitter 715, or various combinations thereof or various components thereof may be examples of means for performing various aspects of link establishment using leaky-wave antennas as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device (e.g., the device 705) in accordance with examples as disclosed herein. For example, the communications manager 720 may be configured as or otherwise support a means for receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers.

In some examples the communications manager 720 may be configured as or otherwise support a means for receiving, from the second device, a beacon signal. The communications manager 720 may be configured as or otherwise support a means for determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers. The communications manager 720 may be configured as or otherwise support a means for generating a first preamble based on the determined preamble configuration. The communications manager 720 may be configured as or otherwise support a means for transmitting the first preamble based on the generating.

Additionally or alternatively, the communications manager 720 may support wireless communication at a first device (e.g., the device 705) in accordance with examples as disclosed herein. For example, the communications manager 720 may be configured as or otherwise support a means for receiving, from a second device, control signaling indicating a timing configuration identifying a set of beacon occasions, each beacon occasion of the set of beacon occasions including a set of resource elements. The communications manager 720 may be configured as or otherwise support a means for receiving, from the second device, a beacon signal during a beacon occasion of the set of beacon occasions and on a subset of resource elements of the set of resource elements associated with the beacon occasion, the subset of resource elements corresponding to an identifier of the second device. The communications manager 720 may be configured as or otherwise support a means for transmitting a report including an indication of the subset of resource elements associated with the received beacon signal.

Additionally or alternatively, the communications manager 720 may support wireless communication at a first device (e.g., the device 705) in accordance with examples as disclosed herein. For example, the communications manager 720 may be configured as or otherwise support a means for receiving a beacon signal, from a second device, the received beacon signal associated with a subset of resource elements of a set of resource elements. The communications manager 720 may be configured as or otherwise support a means for transmitting a preamble based on the received beacon signal, the preamble including a request for cell information associated with the received beacon signal. The communications manager 720 may be configured as or otherwise support a means for receiving the cell information based on the transmitted preamble. The communications manager 720 may be configured as or otherwise support a means for establishing a communication link between the first device and the second device based on the received cell information.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and more efficient utilization of communication resources.

Figure 8:
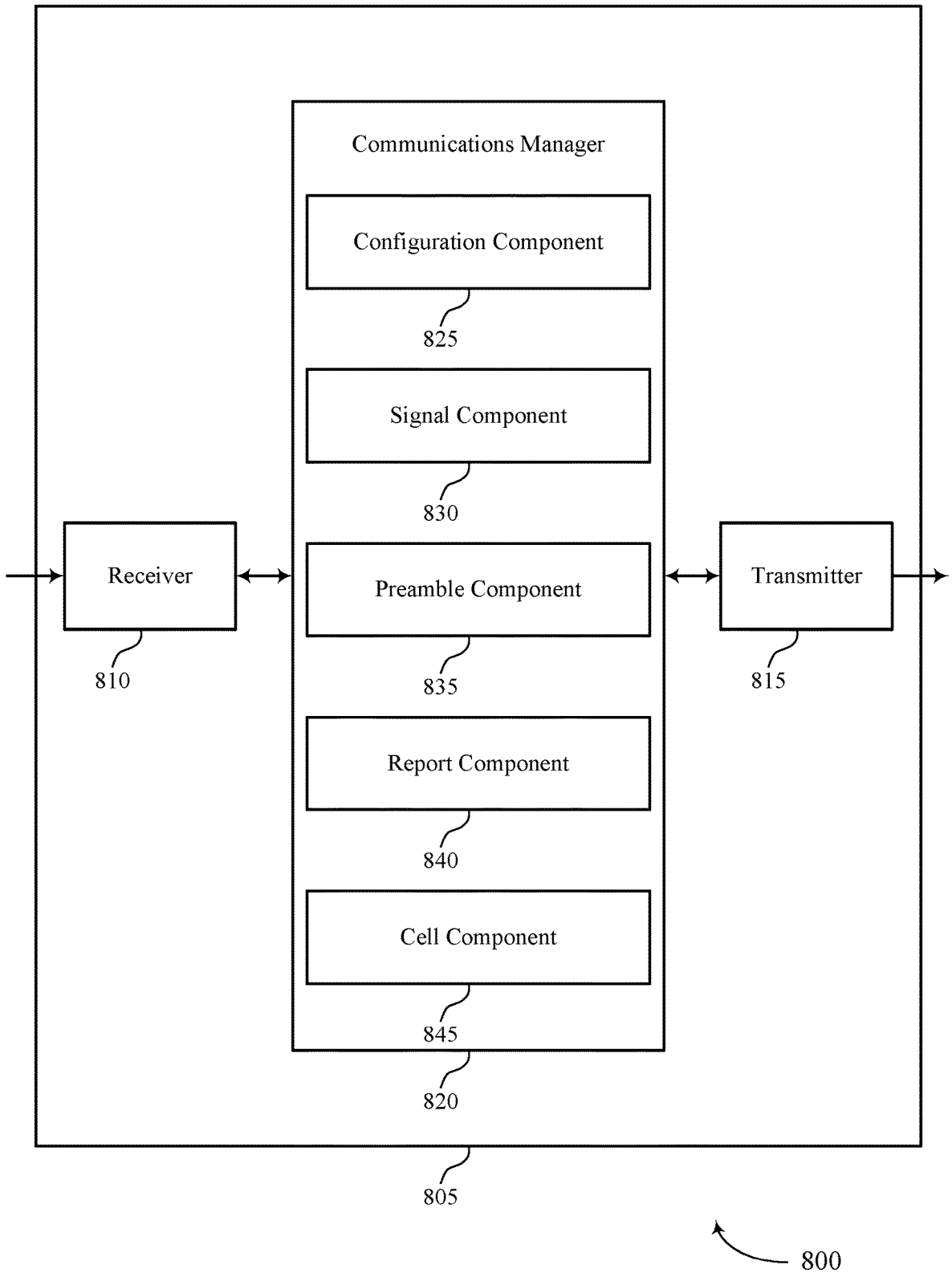

FIG. 8 shows a block diagram 800 of a device 805 that supports link establishment using leaky-wave antennas in accordance with aspects of the present disclosure. The device 805 may be an example of aspects of a device 705, or a base station, or a UE as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to link establishment using leaky-wave antennas). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to link establishment using leaky-wave antennas). In some examples, the transmitter 815 may be co-located with a receiver 810 in a transceiver. The transmitter 815 may utilize a single antenna or a set of multiple antennas.

The device 805, or various components thereof, may be an example of means for performing various aspects of link establishment using leaky-wave antennas as described herein. For example, the communications manager 820 may include a configuration component 825, a signal component 830, a preamble component 835, a report component 840, a cell component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device (e.g., the device 805) in accordance with examples as disclosed herein. The configuration component 825 may be configured as or otherwise support a means for receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The signal component 830 may be configured as or otherwise support a means for receiving, from the second device, a beacon signal. The configuration component 825 may be configured as or otherwise support a means for determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers. The preamble component 835 may be configured as or otherwise support a means for generating a first preamble based on the determined preamble configuration. The preamble component 835 may be configured as or otherwise support a means for transmitting the first preamble based on the generating.

Additionally or alternatively, the communications manager 820 may support wireless communication at a first device (e.g., the device 805) in accordance with examples as disclosed herein. The configuration component 825 may be configured as or otherwise support a means for receiving, from a second device, control signaling indicating a timing configuration identifying a set of beacon occasions, each beacon occasion of the set of beacon occasions including a set of resource elements. The signal component 830 may be configured as or otherwise support a means for receiving, from the second device, a beacon signal during a beacon occasion of the set of beacon occasions and on a subset of resource elements of the set of resource elements associated with the beacon occasion, the subset of resource elements corresponding to an identifier of the second device. The report component 840 may be configured as or otherwise support a means for transmitting a report including an indication of the subset of resource elements associated with the received beacon signal.

Additionally or alternatively, the communications manager 820 may support wireless communication at a first device (e.g., the device 805) in accordance with examples as disclosed herein. The signal component 830 may be configured as or otherwise support a means for receiving a beacon signal, from a second device, the received beacon signal associated with a subset of resource elements of a set of resource elements. The preamble component 835 may be configured as or otherwise support a means for transmitting a preamble based on the received beacon signal, the preamble including a request for cell information associated with the received beacon signal. The cell component 845 may be configured as or otherwise support a means for receiving the cell information based on the transmitted preamble. The cell component 845 may be configured as or otherwise support a means for establishing a communication link between the first device and the second device based on the received cell information.

Figure 9:
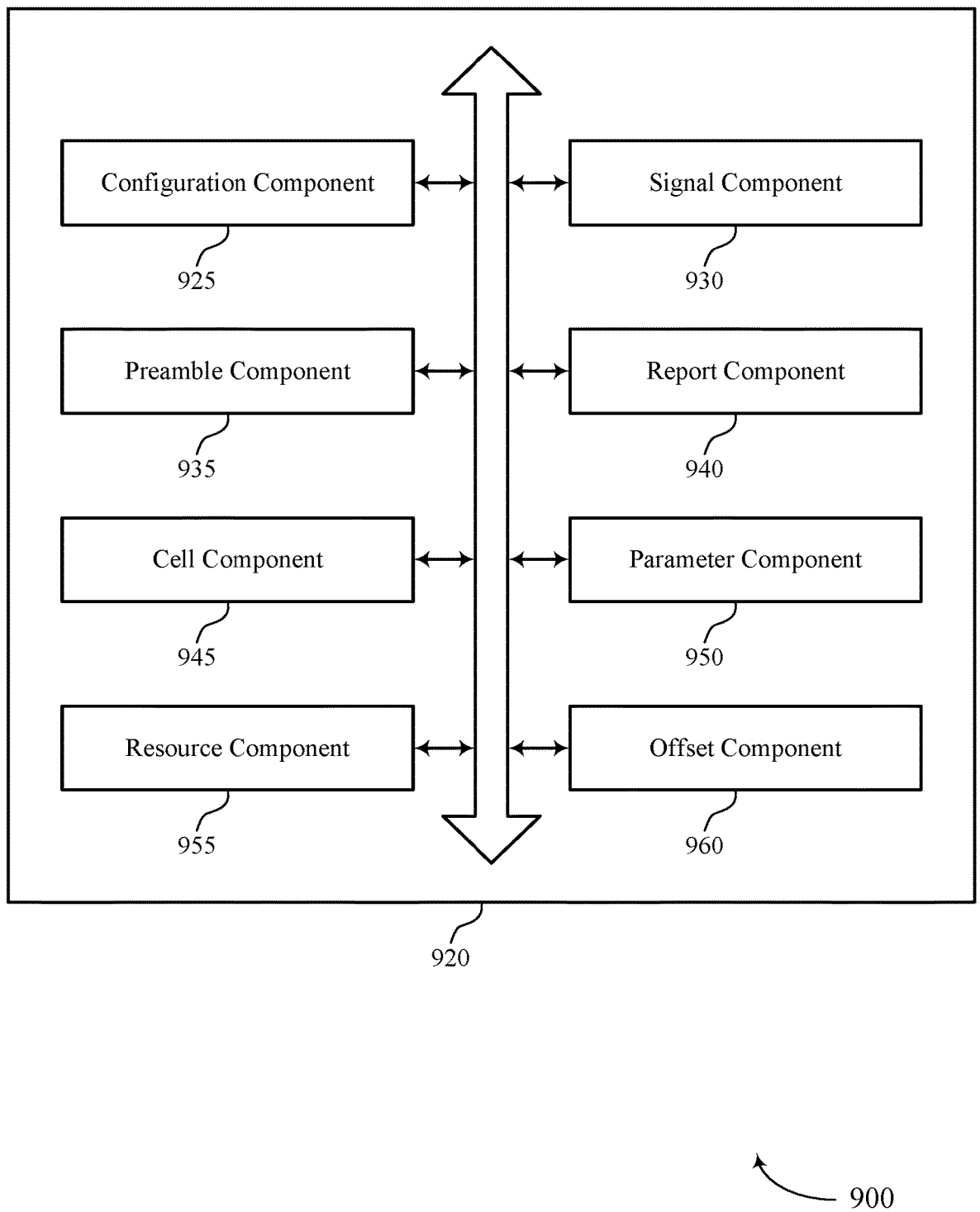
FIG. 9 shows a block diagram of a communications manager that supports link establishment using leaky-wave antennas in accordance with aspects of the present disclosure.

FIG. 9 shows a block diagram 900 of a communications manager 920 that supports link establishment using leaky-wave antennas in accordance with aspects of the present disclosure. The communications manager 920 may be an example of aspects of a communications manager 720, a communications manager 820, or both, as described herein. The communications manager 920, or various components thereof, may be an example of means for performing various aspects of link establishment using leaky-wave antennas as described herein. For example, the communications manager 920 may include a configuration component 925, a signal component 930, a preamble component 935, a report component 940, a cell component 945, a parameter component 950, a resource component 955, an offset component 960, or any combination thereof. Each of these components may communicate, directly or indirectly, with one another (e.g., via one or more buses).

The communications manager 920 may support wireless communication at a first device in accordance with examples as disclosed herein. The configuration component 925 may be configured as or otherwise support a means for receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The signal component 930 may be configured as or otherwise support a means for receiving, from the second device, a beacon signal. In some examples, the configuration component 925 may be configured as or otherwise support a means for determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers. The preamble component 935 may be configured as or otherwise support a means for generating a first preamble based on the determined preamble configuration. In some examples, the preamble component 935 may be configured as or otherwise support a means for transmitting the first preamble based on the generating.

In some examples, the preamble component 935 may be configured as or otherwise support a means for determining, based on the preamble configuration, one or more of a subcarrier spacing, a preamble duration, a transmit power level, or a cyclic shift value associated with the first preamble. In some examples, the preamble component 935 may be configured as or otherwise support a means for generating the first preamble is based on one or more of the subcarrier spacing, the preamble duration, the transmit power level, or the cyclic shift value associated with the first preamble.

In some examples, the received beacon signal may be associated with an angle of the set of multiple angles associated with the wireless communication and determining the preamble configuration may be based on the angle associated with the wireless communication being greater than or equal to a threshold.

In some examples, the received beacon signal may be associated with a power signature identifier of the set of power signature identifiers and determining the preamble configuration may be based on the power signature identifier.

In some examples, the preamble component 935 may be configured as or otherwise support a means for multiplexing the first preamble with a second preamble associated with a third device based on a time-division multiplexing scheme, a frequency-division multiplexing scheme, or a code-division multiplexing scheme, the second preamble associated with a same preamble configuration as the first preamble. In some examples, the preamble component 935 may be configured as or otherwise support a means for transmitting the first preamble is based on multiplexing the first preamble with the second preamble associated with the third device. In some examples, the at least one subset of resource elements includes a subset of frequencies of a set of frequencies. In some examples, the parameter component 950 may be configured as or otherwise support a means for receiving an indication including multiple sets of parameters, where each set of parameters corresponds to the at least one power signature identifier of the set of power signature identifiers.

In some examples, the parameter component 950 may be configured as or otherwise support a means for receiving at least one of SI, an RRC configuration message, or an SSB-based configuration including the indication including the multiple sets of parameters. In some examples, the resource component 955 may be configured as or otherwise support a means for determining the set of resource elements is based on receiving at least one of the SI, the RRC configuration message, or the SSB-based configuration including the indication including the multiple sets of parameters.

Additionally or alternatively, the communications manager 920 may support wireless communication at a first device in accordance with examples as disclosed herein. In some examples, the configuration component 925 may be configured as or otherwise support a means for receiving, from a second device, control signaling indicating a timing configuration identifying a set of beacon occasions, each beacon occasion of the set of beacon occasions including a set of resource elements. In some examples, the signal component 930 may be configured as or otherwise support a means for receiving, from the second device, a beacon signal during a beacon occasion of the set of beacon occasions and on a subset of resource elements of the set of resource elements associated with the beacon occasion, the subset of resource elements corresponding to an identifier of the second device. The report component 940 may be configured as or otherwise support a means for transmitting a report including an indication of the subset of resource elements associated with the received beacon signal.

In some examples, the signal component 930 may be configured as or otherwise support a means for demultiplexing the beacon signal based on one or more of a time-division demultiplexing scheme or a frequency-division demultiplexing scheme, the beacon signal multiplexed with another beacon signal associated with the second device. In some examples, the signal component 930 may be configured as or otherwise support a means for receiving the beacon signal is based on demultiplexing the beacon signal.

In some examples, the resource component 955 may be configured as or otherwise support a means for determining a symbol index associated with the subset of resource elements of the set of resource elements associated with the beacon occasion. In some examples, the report may include an indication of the symbol index associated with the subset of resource elements of the set of resource elements associated with the beacon occasion.

In some examples, the resource component 955 may be configured as or otherwise support a means for determining a resource element group index associated with the subset of resource elements of the set of resource elements associated with the beacon occasion. In some examples, the report may include an indication of the resource element group index associated with the subset of resource elements of the set of resource elements associated with the beacon occasion. In some examples, the second device includes a network entity.

In some examples, to support receiving the control signaling indicating the timing configuration, the configuration component 925 may be configured as or otherwise support a means for receiving the control signaling indicating the timing configuration from the second device, where the timing configuration is configured by the second device or a centralized unit of the second device.

Additionally or alternatively, the communications manager 920 may support wireless communication at a first device in accordance with examples as disclosed herein. In some examples, the signal component 930 may be configured as or otherwise support a means for receiving a beacon signal, from a second device, the received beacon signal associated with a subset of resource elements of a set of resource elements. In some examples, the preamble component 935 may be configured as or otherwise support a means for transmitting a preamble based on the received beacon signal, the preamble including a request for cell information associated with the received beacon signal. The cell component 945 may be configured as or otherwise support a means for receiving the cell information based on the transmitted preamble. In some examples, the cell component 945 may be configured as or otherwise support a means for establishing a communication link between the first device and the second device based on the received cell information.

In some examples, the offset component 960 may be configured as or otherwise support a means for determining an offset between a first symbol associated with the beacon signal and a second symbol associated with a preamble occasion. In some examples, the preamble component 935 may be configured as or otherwise support a means for transmitting the preamble is based on determining the offset between the first symbol associated with the beacon signal and the second symbol associated with the preamble occasion. In some examples, the preamble occupies a second subset of resource elements of the set of resource elements, the second subset of resource elements associated with a narrowband.

In some examples, the cell component 945 may be configured as or otherwise support a means for receiving at least one of an SSB a MIB, or a SIB including the cell information. In some examples, the cell component 945 may be configured as or otherwise support a means for establishing the communication link between the first device and the second device is based on receiving the at least one of the SSB, the MIB, or the SIB including the cell information. In some examples, the cell component 945 may be configured as or otherwise support a means for establishing the communication link between the first device and the second device based on a RNTI of a set of predetermined RNTIs based on the cell information. In some examples, the RNTI is based on one or more of a beacon occasion associated with the beacon signal or a preamble occasion associated with the preamble.

Figure 10:
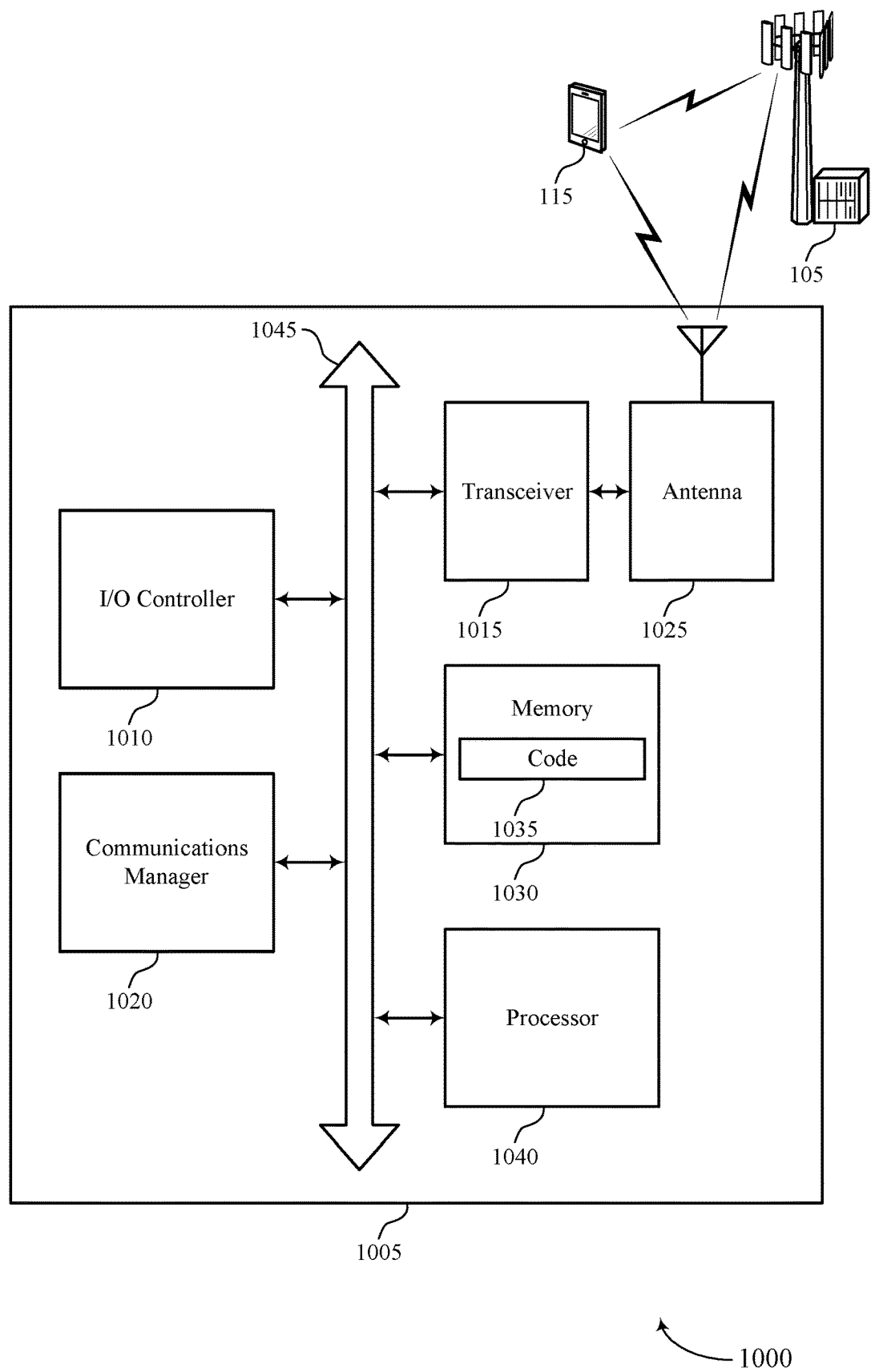
FIG. 10 shows a diagram of a system including a device that supports link establishment using leaky-wave antennas in accordance with aspects of the present disclosure.

FIG. 10 shows a diagram of a system 1000 including a device 1005 that supports link establishment using leaky-wave antennas in accordance with aspects of the present disclosure. The device 1005 may be an example of or include the components of a device 705, a device 805, or a device (e.g., a base station or a UE) as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. In some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting link establishment using leaky-wave antennas). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first device (e.g., the device 1005) in accordance with examples as disclosed herein. For example, the communications manager 1020 may be configured as or otherwise support a means for receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The communications manager 1020 may be configured as or otherwise support a means for receiving, from the second device, a beacon signal. The communications manager 1020 may be configured as or otherwise support a means for determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers. The communications manager 1020 may be configured as or otherwise support a means for generating a first preamble based on the determined preamble configuration. The communications manager 1020 may be configured as or otherwise support a means for transmitting the first preamble based on the generating.

Additionally or alternatively, the communications manager 1020 may support wireless communication at a first device (e.g., the device 1005) in accordance with examples as disclosed herein. For example, the communications manager 1020 may be configured as or otherwise support a means for receiving, from a second device, control signaling indicating a timing configuration identifying a set of beacon occasions, each beacon occasion of the set of beacon occasions including a set of resource elements. The communications manager 1020 may be configured as or otherwise support a means for receiving, from the second device, a beacon signal during a beacon occasion of the set of beacon occasions and on a subset of resource elements of the set of resource elements associated with the beacon occasion, the subset of resource elements corresponding to an identifier of the second device. The communications manager 1020 may be configured as or otherwise support a means for transmitting a report including an indication of the subset of resource elements associated with the received beacon signal.

Additionally or alternatively, the communications manager 1020 may support wireless communication at a first device (e.g., the device 1005) in accordance with examples as disclosed herein. For example, the communications manager 1020 may be configured as or otherwise support a means for receiving a beacon signal, from a second device, the received beacon signal associated with a subset of resource elements of a set of resource elements. The communications manager 1020 may be configured as or otherwise support a means for transmitting a preamble based on the received beacon signal, the preamble including a request for cell information associated with the received beacon signal. The communications manager 1020 may be configured as or otherwise support a means for receiving the cell information based on the transmitted preamble. The communications manager 1020 may be configured as or otherwise support a means for establishing a communication link between the first device and the second device based on the received cell information.

By including or configuring the communications manager 1020 in accordance with examples as described herein, the device 1005 may support techniques for improved user experience related to reduced processing, reduced power consumption, more efficient utilization of communication resources, and improved coordination between devices (e.g., the first device and the second device).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of link establishment using leaky-wave antennas as described herein, or the processor 1040 and the memory 1030 may be otherwise configured to perform or support such operations.

Figure 11:
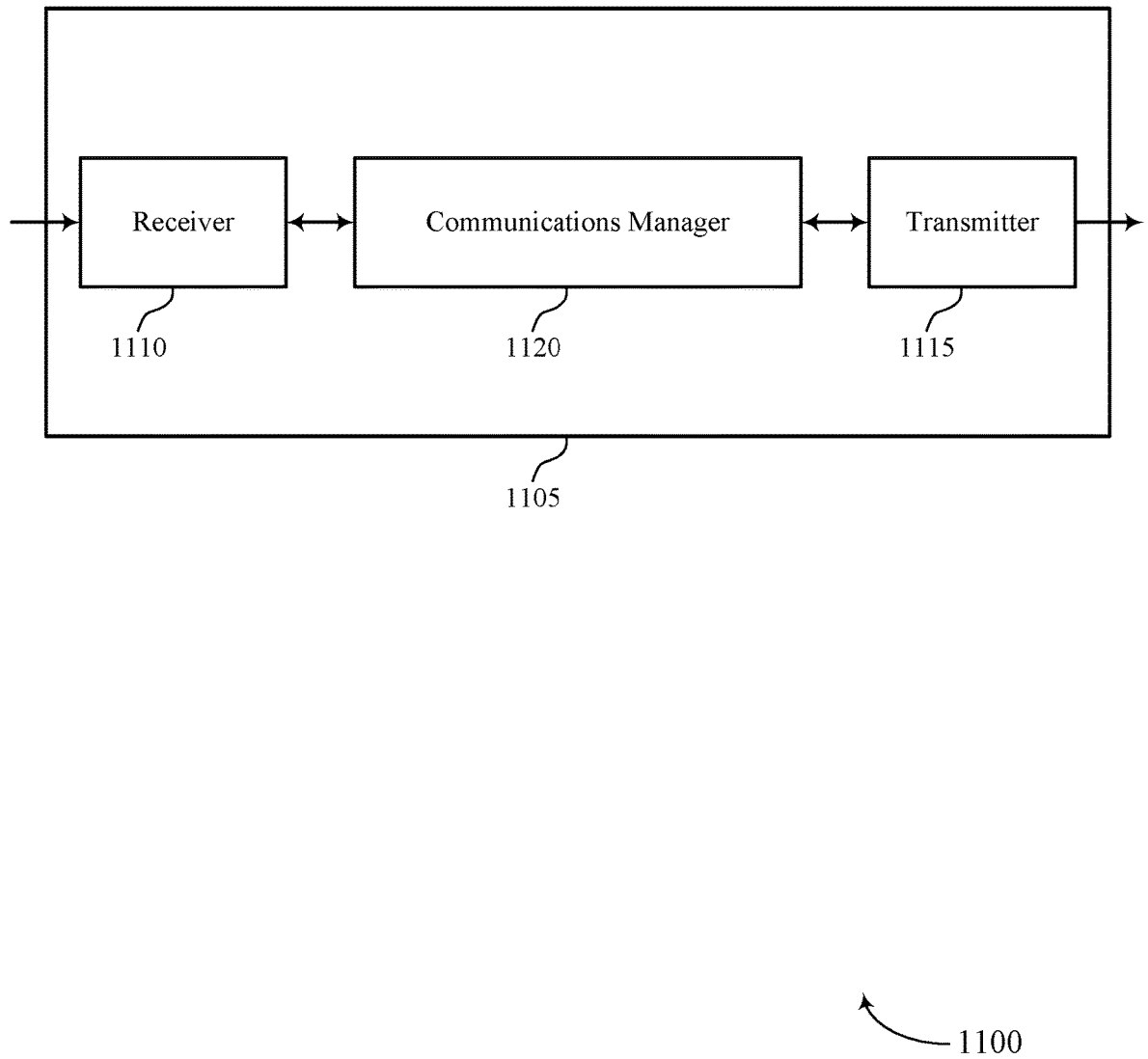
FIGS. 11 and 12 show block diagrams of devices that support link establishment using leaky-wave antennas in accordance with aspects of the present disclosure.

FIG. 11 shows a block diagram 1100 of a device 1105 that supports link establishment using leaky-wave antennas in accordance with aspects of the present disclosure. The device 1105 may be an example of aspects of a device (e.g., a base station or a UE) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to link establishment using leaky-wave antennas). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to link establishment using leaky-wave antennas). In some examples, the transmitter 1115 may be co-located with a receiver 1110 in a transceiver. The transmitter 1115 may utilize a single antenna or a set of multiple antennas.

The communications manager 1120, the receiver 1110, the transmitter 1115, or various combinations thereof or various components thereof may be examples of means for performing various aspects of link establishment using leaky-wave antennas as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a second device (e.g., the device 1105) in accordance with examples as disclosed herein. For example, the communications manager 1120 may be configured as or otherwise support a means for transmitting, to a first device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The communications manager 1120 may be configured as or otherwise support a means for transmitting a beacon signal, the beacon signal associated with one or more of at least one subset of resource elements of the set of resource elements, at least one angle of the set of multiple angles associated with the wireless communication, or at least one power signature identifier of the set of power signature identifiers. The communications manager 1120 may be configured as or otherwise support a means for receiving a preamble based on the transmitted beacon signal.

Additionally or alternatively, the communications manager 1120 may support wireless communication at a second device (e.g., the device 1105) in accordance with examples as disclosed herein. For example, the communications manager 1120 may be configured as or otherwise support a means for transmitting, to a first device, control signaling indicating a timing configuration identifying a set of beacon occasions, each beacon occasion of the set of beacon occasions including a set of resource elements. The communications manager 1120 may be configured as or otherwise support a means for transmitting a beacon signal during a beacon occasion of the set of beacon occasions and on a subset of resource elements of the set of resource elements associated with the beacon occasion, the subset of resource elements corresponding to an identifier of the second device. The communications manager 1120 may be configured as or otherwise support a means for receiving, from the first device, a report including an indication of the subset of resource elements associated with the transmitted beacon signal.

Additionally or alternatively, the communications manager 1120 may support wireless communication at a second device (e.g., the device 1105)) in accordance with examples as disclosed herein. For example, the communications manager 1120 may be configured as or otherwise support a means for transmitting a beacon signal, the transmitted beacon signal associated with a subset of resource elements of a set of resource elements. The communications manager 1120 may be configured as or otherwise support a means for receiving a preamble, from a first device, based on the transmitted beacon signal, the preamble including a request for cell information associated with the transmitted beacon signal. The communications manager 1120 may be configured as or otherwise support a means for transmitting the cell information based on the received preamble. The communications manager 1120 may be configured as or otherwise support a means for establishing a communication link between the first device and the second device based on the transmitted cell information.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing and more efficient utilization of communication resources.

Figure 12:
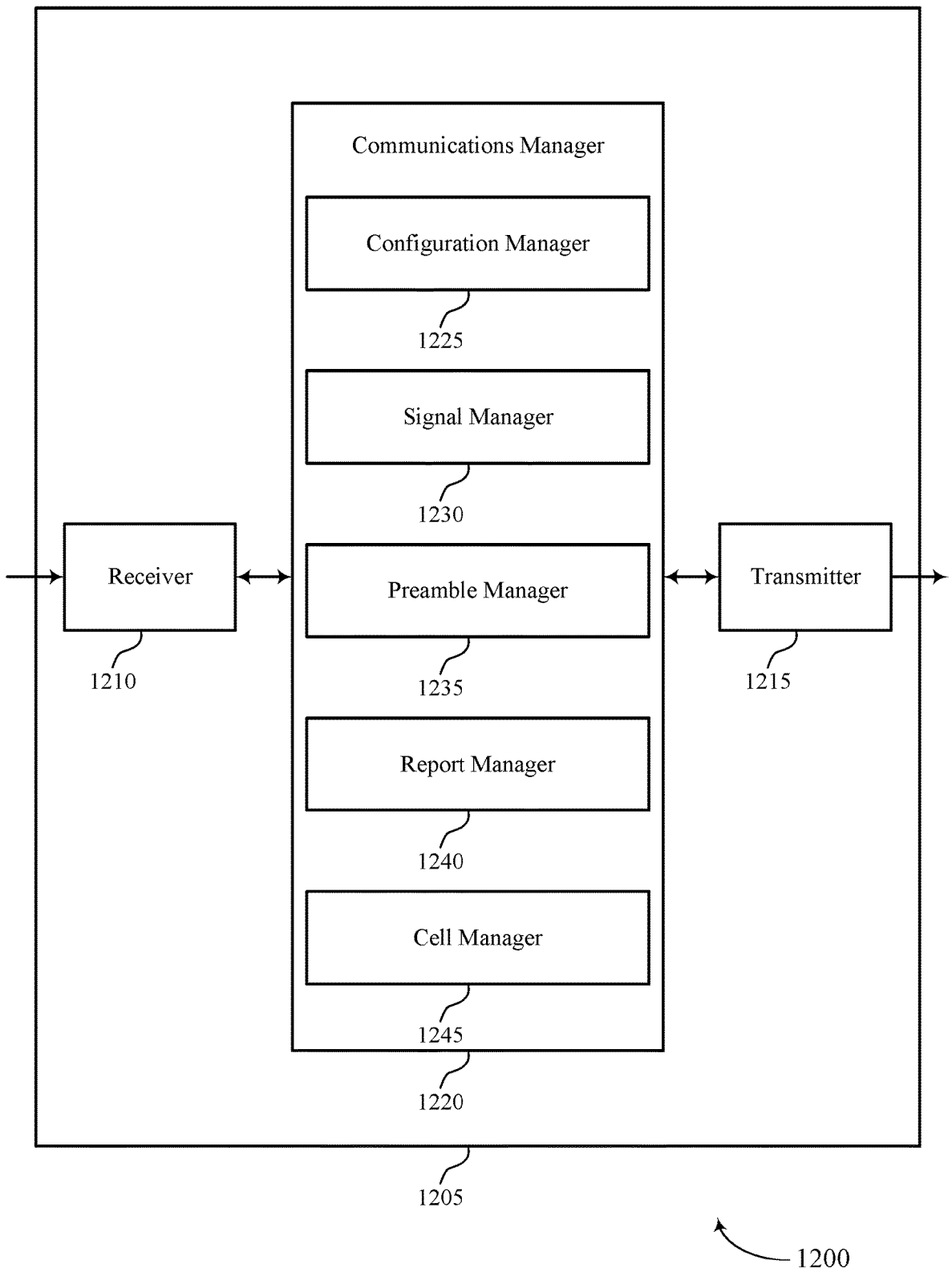

FIG. 12 shows a block diagram 1200 of a device 1205 that supports link establishment using leaky-wave antennas in accordance with aspects of the present disclosure. The device 1205 may be an example of aspects of a device 1105 or a device (e.g., a base station or a UE) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to link establishment using leaky-wave antennas). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to link establishment using leaky-wave antennas). In some examples, the transmitter 1215 may be co-located with a receiver 1210 in a transceiver. The transmitter 1215 may utilize a single antenna or a set of multiple antennas.

The device 1205, or various components thereof, may be an example of means for performing various aspects of link establishment using leaky-wave antennas as described herein. For example, the communications manager 1220 may include a configuration manager 1225, a signal manager 1230, a preamble manager 1235, a report manager 1240, a cell manager 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a second device (e.g., the device 1205) in accordance with examples as disclosed herein. The configuration manager 1225 may be configured as or otherwise support a means for transmitting, to a first device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The signal manager 1230 may be configured as or otherwise support a means for transmitting a beacon signal, the beacon signal associated with one or more of at least one subset of resource elements of the set of resource elements, at least one angle of the set of multiple angles associated with the wireless communication, or at least one power signature identifier of the set of power signature identifiers. The preamble manager 1235 may be configured as or otherwise support a means for receiving a preamble based on the transmitted beacon signal.

Additionally or alternatively, the communications manager 1220 may support wireless communication at a second device (e.g., the device 1205) in accordance with examples as disclosed herein. The configuration manager 1225 may be configured as or otherwise support a means for transmitting, to a first device, control signaling indicating a timing configuration identifying a set of beacon occasions, each beacon occasion of the set of beacon occasions including a set of resource elements. The preamble manager 1235 may be configured as or otherwise support a means for transmitting a beacon signal during a beacon occasion of the set of beacon occasions and on a subset of resource elements of the set of resource elements associated with the beacon occasion, the subset of resource elements corresponding to an identifier of the second device. The report manager 1240 may be configured as or otherwise support a means for receiving, from the first device, a report including an indication of the subset of resource elements associated with the transmitted beacon signal.

Additionally or alternatively, the communications manager 1220 may support wireless communication at a second device (e.g., the device 1205) in accordance with examples as disclosed herein. The signal manager 1230 may be configured as or otherwise support a means for transmitting a beacon signal, the transmitted beacon signal associated with a subset of resource elements of a set of resource elements. The preamble manager 1235 may be configured as or otherwise support a means for receiving a preamble, from a first device, based on the transmitted beacon signal, the preamble including a request for cell information associated with the transmitted beacon signal. The cell manager 1245 may be configured as or otherwise support a means for transmitting the cell information based on the received preamble. The cell manager 1245 may be configured as or otherwise support a means for establishing a communication link between the first device and the second device based on the transmitted cell information.

Figure 13:
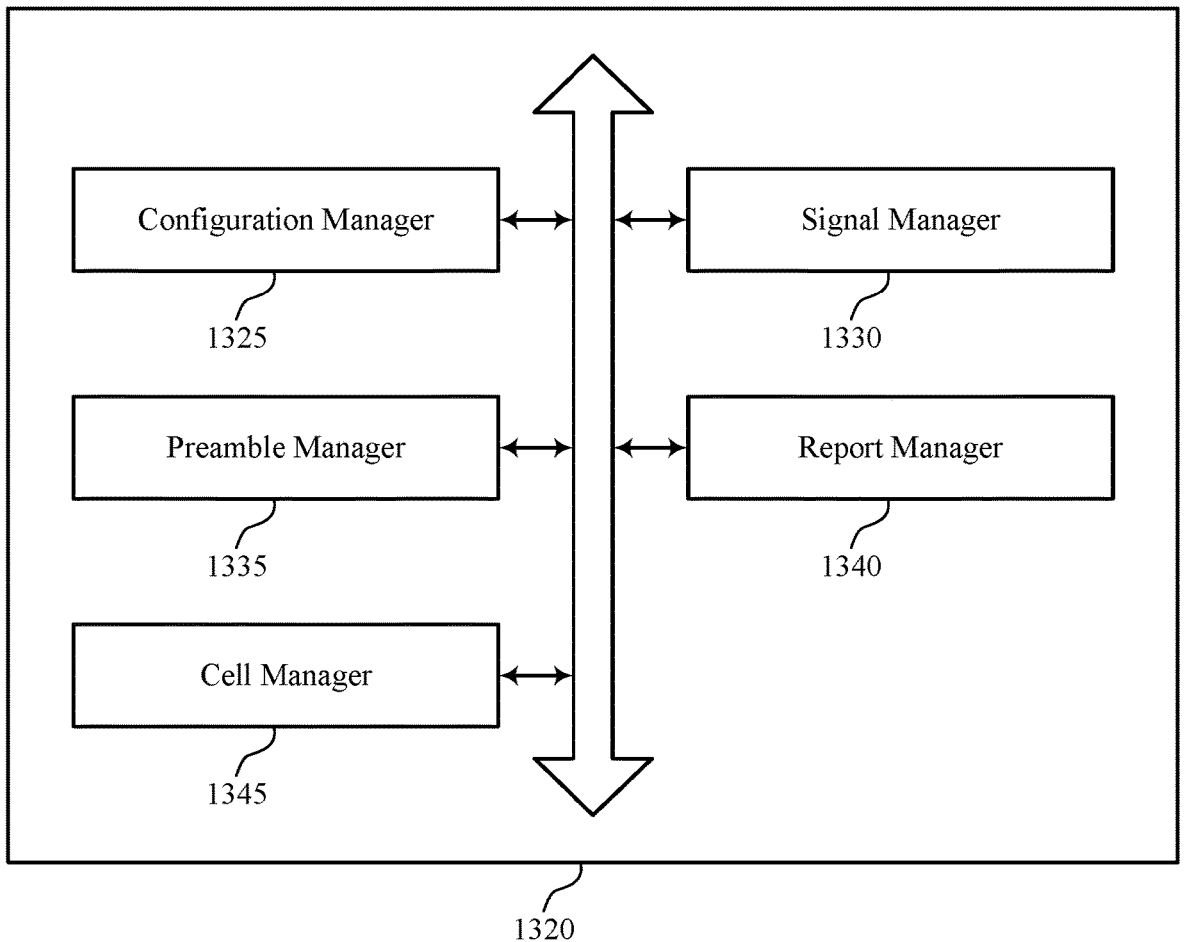
FIG. 13 shows a block diagram of a communications manager that supports link establishment using leaky-wave antennas in accordance with aspects of the present disclosure.

FIG. 13 shows a block diagram 1300 of a communications manager 1320 that supports link establishment using leaky-wave antennas in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of link establishment using leaky-wave antennas as described herein. For example, the communications manager 1320 may include a configuration manager 1325, a signal manager 1330, a preamble manager 1335, a report manager 1340, a cell manager 1345, or any combination thereof. Each of these components may communicate, directly or indirectly, with one another (e.g., via one or more buses).

The communications manager 1320 may support wireless communication at a second device in accordance with examples as disclosed herein. The configuration manager 1325 may be configured as or otherwise support a means for transmitting, to a first device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The signal manager 1330 may be configured as or otherwise support a means for transmitting a beacon signal. In some examples, the beacon signal may be associated with one or more of at least one subset of resource elements of the set of resource elements, at least one angle of the set of multiple angles associated with the wireless communication, or at least one power signature identifier of the set of power signature identifiers. The preamble manager 1335 may be configured as or otherwise support a means for receiving a preamble based on the transmitted beacon signal.

In some examples, to support transmitting the beacon signal, the signal manager 1330 may be configured as or otherwise support a means for transmitting the beacon signal via a frequency-domain beam sweeping operation. Additionally or alternatively, the communications manager 1320 may support wireless communication at a second device in accordance with examples as disclosed herein. In some examples, the configuration manager 1325 may be configured as or otherwise support a means for transmitting, to a first device, control signaling indicating a timing configuration identifying a set of beacon occasions, each beacon occasion of the set of beacon occasions including a set of resource elements. In some examples, the preamble manager 1335 may be configured as or otherwise support a means for transmitting a beacon signal during a beacon occasion of the set of beacon occasions and on a subset of resource elements of the set of resource elements associated with the beacon occasion, the subset of resource elements corresponding to an identifier of the second device. The report manager 1340 may be configured as or otherwise support a means for receiving, from the first device, a report including an indication of the subset of resource elements associated with the transmitted beacon signal.

Additionally or alternatively, the communications manager 1320 may support wireless communication at a second device in accordance with examples as disclosed herein. In some examples, the signal manager 1330 may be configured as or otherwise support a means for transmitting a beacon signal, the transmitted beacon signal associated with a subset of resource elements of a set of resource elements. In some examples, the preamble manager 1335 may be configured as or otherwise support a means for receiving a preamble, from a first device, based on the transmitted beacon signal, the preamble including a request for cell information associated with the transmitted beacon signal. The cell manager 1345 may be configured as or otherwise support a means for transmitting the cell information based on the received preamble. In some examples, the cell manager 1345 may be configured as or otherwise support a means for establishing a communication link between the first device and the second device based on the transmitted cell information.

Figure 14:
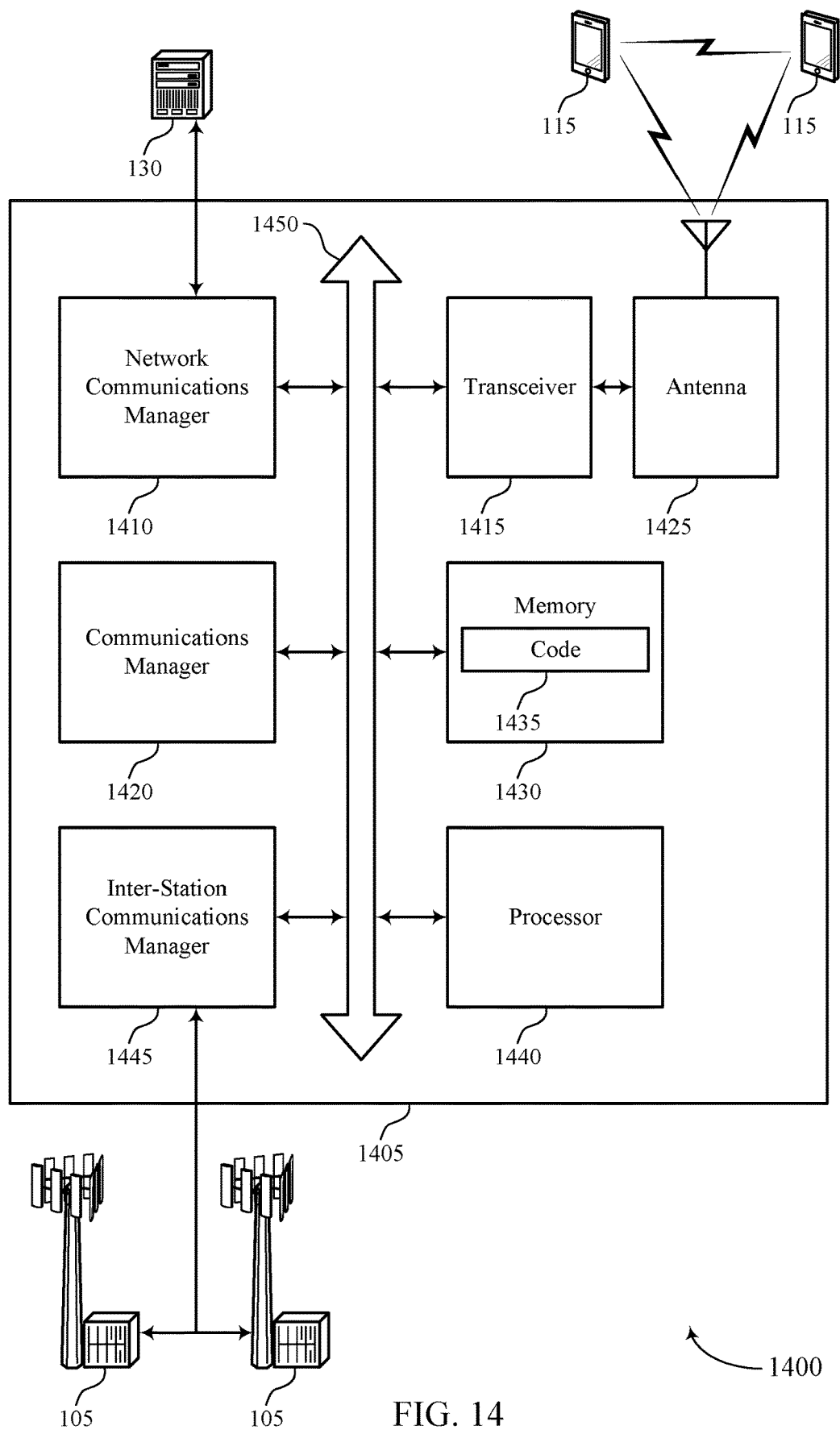
FIG. 14 shows a diagram of a system including a device that supports link establishment using leaky-wave antennas in accordance with aspects of the present disclosure.

FIG. 14 shows a diagram of a system 1400 including a device 1405 that supports link establishment using leaky-wave antennas in accordance with aspects of the present disclosure. The device 1405 may be an example of or include the components of a device 1105, a device 1205, or a device (e.g., a base station or a UE) as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115. In some cases, the device 1405 may include a single antenna 1425. In some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting link establishment using leaky-wave antennas). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with base stations 105, and may include a controller or scheduler for controlling communications with UEs 115 in cooperation with base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a second device (e.g., the device 1405) in accordance with examples as disclosed herein. For example, the communications manager 1420 may be configured as or otherwise support a means for transmitting, to a first device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The communications manager 1420 may be configured as or otherwise support a means for transmitting a beacon signal, the beacon signal associated with one or more of at least one subset of resource elements of the set of resource elements, at least one angle of the set of multiple angles associated with the wireless communication, or at least one power signature identifier of the set of power signature identifiers. The communications manager 1420 may be configured as or otherwise support a means for receiving a preamble based on the transmitted beacon signal.

Additionally or alternatively, the communications manager 1420 may support wireless communication at a second device (e.g., the device 1405) in accordance with examples as disclosed herein. For example, the communications manager 1420 may be configured as or otherwise support a means for transmitting, to a first device, control signaling indicating a timing configuration identifying a set of beacon occasions, each beacon occasion of the set of beacon occasions including a set of resource elements. The communications manager 1420 may be configured as or otherwise support a means for transmitting a beacon signal during a beacon occasion of the set of beacon occasions and on a subset of resource elements of the set of resource elements associated with the beacon occasion, the subset of resource elements corresponding to an identifier of the second device. The communications manager 1420 may be configured as or otherwise support a means for receiving, from the first device, a report including an indication of the subset of resource elements associated with the transmitted beacon signal.

Additionally or alternatively, the communications manager 1420 may support wireless communication at a second device (e.g., the device 1405) in accordance with examples as disclosed herein. For example, the communications manager 1420 may be configured as or otherwise support a means for transmitting a beacon signal, the transmitted beacon signal associated with a subset of resource elements of a set of resource elements. The communications manager 1420 may be configured as or otherwise support a means for receiving a preamble, from a first device, based on the transmitted beacon signal, the preamble including a request for cell information associated with the transmitted beacon signal. The communications manager 1420 may be configured as or otherwise support a means for transmitting the cell information based on the received preamble. The communications manager 1420 may be configured as or otherwise support a means for establishing a communication link between the first device and the second device based on the transmitted cell information. By including or configuring the communications manager 1420 in accordance with examples as described herein, the device 1405 may support techniques for improved communication reliability, more efficient utilization of communication resources, and improved coordination between devices (e.g., the first device and the second device).

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of link establishment using leaky-wave antennas as described herein, or the processor 1440 and the memory 1430 may be otherwise configured to perform or support such operations.

Figure 15:
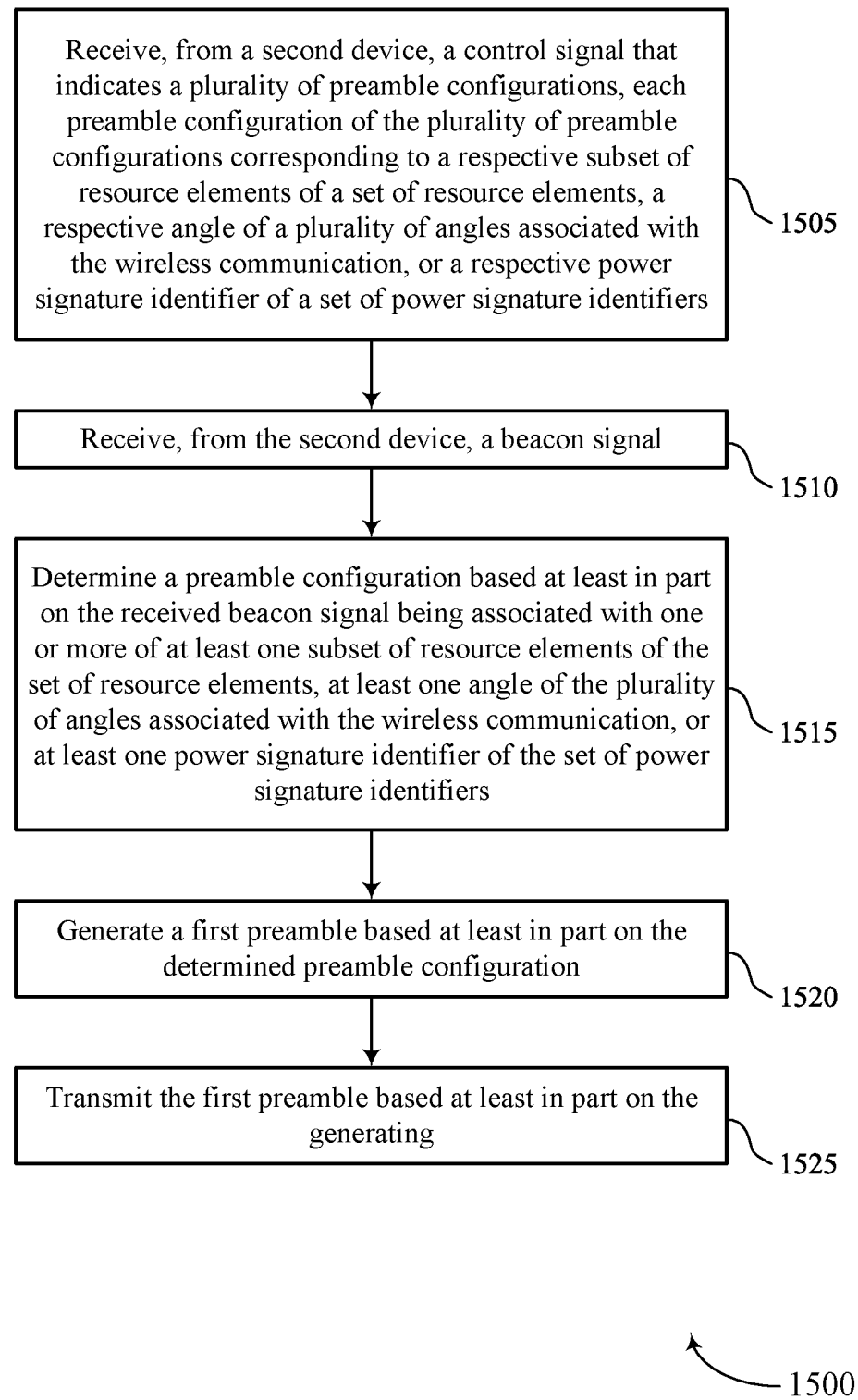
FIGS. 15 through 20 show flowcharts illustrating methods that support link establishment using leaky-wave antennas in accordance with aspects of the present disclosure.

FIG. 15 shows a flowchart illustrating a method 1500 that supports link establishment using leaky-wave antennas in accordance with aspects of the present disclosure. The operations of the method 1500 may be implemented by a device or its components as described herein. For example, the operations of the method 1500 may be performed by a device as described with reference to FIGS. 1 through 10. In some examples, a device may execute a set of instructions to control the functional elements of the device to perform the described functions. Additionally or alternatively, the device may perform aspects of the described functions using special-purpose hardware.

At 1505, the method may include receiving, from a second device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The operations of 1505 may be performed in accordance with examples as disclosed herein. In some examples, aspects of the operations of 1505 may be performed by a configuration component 925 as described with reference to FIG. 9.

At 1510, the method may include receiving, from the second device, a beacon signal. The operations of 1510 may be performed in accordance with examples as disclosed herein. In some examples, aspects of the operations of 1510 may be performed by a signal component 930 as described with reference to FIG. 9.

At 1515, the method may include determining a preamble configuration based on the received beacon signal being associated with one or more of at least one subset of resource elements of the set of resource elements, at least one angle of the set of multiple angles associated with the wireless communication, or at least one power signature identifier of the set of power signature identifiers. The operations of 1515 may be performed in accordance with examples as disclosed herein. In some examples, aspects of the operations of 1515 may be performed by a configuration component 925 as described with reference to FIG. 9.

At 1520, the method may include generating a first preamble based on the determined preamble configuration. The operations of 1520 may be performed in accordance with examples as disclosed herein. In some examples, aspects of the operations of 1520 may be performed by a preamble component 935 as described with reference to FIG. 9.

At 1525, the method may include transmitting the first preamble based on the generating. The operations of 1525 may be performed in accordance with examples as disclosed herein. In some examples, aspects of the operations of 1525 may be performed by a preamble component 935 as described with reference to FIG. 9.

Figure 16:
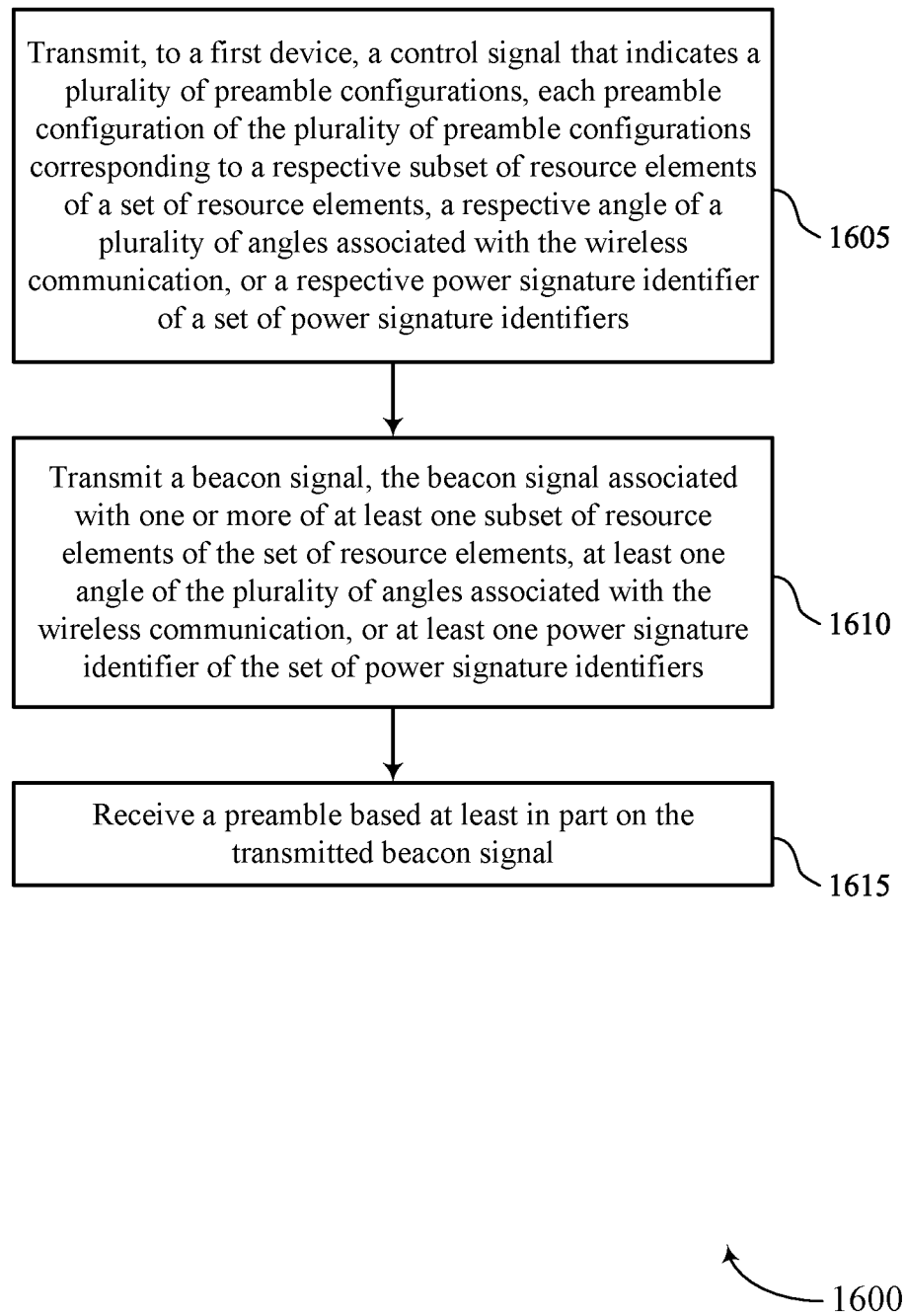

FIG. 16 shows a flowchart illustrating a method 1600 that supports link establishment using leaky-wave antennas in accordance with aspects of the present disclosure. The operations of the method 1600 may be implemented by a device or its components as described herein. For example, the operations of the method 1600 may be performed by a device as described with reference to FIGS. 1 through 6 and 11 through 14. In some examples, a device may execute a set of instructions to control the functional elements of the device to perform the described functions. Additionally or alternatively, the device may perform aspects of the described functions using special-purpose hardware.

At 1605, the method may include transmitting, to a first device, a control signal that indicates a set of multiple preamble configurations, each preamble configuration of the set of multiple preamble configurations corresponding to a respective subset of resource elements of a set of resource elements, a respective angle of a set of multiple angles associated with the wireless communication, or a respective power signature identifier of a set of power signature identifiers. The operations of 1605 may be performed in accordance with examples as disclosed herein. In some examples, aspects of the operations of 1605 may be performed by a configuration manager 1325 as described with reference to FIG. 13.

At 1610, the method may include transmitting a beacon signal, the beacon signal associated with one or more of at least one subset of resource elements of the set of resource elements, at least one angle of the set of multiple angles associated with the wireless communication, or at least one power signature identifier of the set of power signature identifiers. The operations of 1610 may be performed in accordance with examples as disclosed herein. In some examples, aspects of the operations of 1610 may be performed by a signal manager 1330 as described with reference to FIG. 13.

At 1615, the method may include receiving a preamble based on the transmitted beacon signal. The operations of 1615 may be performed in accordance with examples as disclosed herein. In some examples, aspects of the operations of 1615 may be performed by a preamble manager 1335 as described with reference to FIG. 13.

Figure 17:
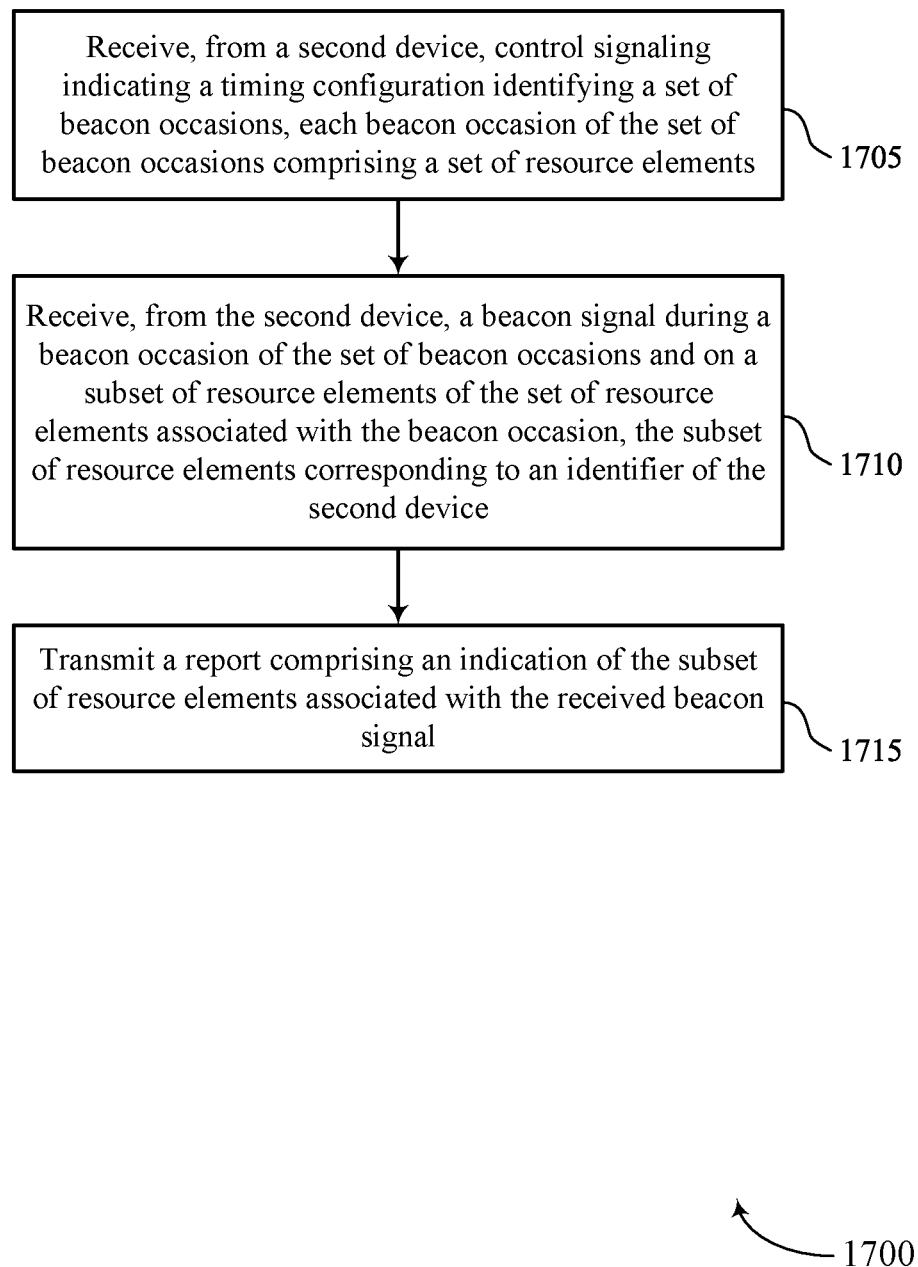

FIG. 17 shows a flowchart illustrating a method 1700 that supports link establishment using leaky-wave antennas in accordance with aspects of the present disclosure. The operations of the method 1700 may be implemented by a device or its components as described herein. For example, the operations of the method 1700 may be performed by a device as described with reference to FIGS. 1 through 10. In some examples, a device may execute a set of instructions to control the functional elements of the device to perform the described functions. Additionally or alternatively, the device may perform aspects of the described functions using special-purpose hardware.

At 1705, the method may include receiving, from a second device, control signaling indicating a timing configuration identifying a set of beacon occasions, each beacon occasion of the set of beacon occasions including a set of resource elements. The operations of 1705 may be performed in accordance with examples as disclosed herein. In some examples, aspects of the operations of 1705 may be performed by a configuration component 925 as described with reference to FIG. 9.

At 1710, the method may include receiving, from the second device, a beacon signal during a beacon occasion of the set of beacon occasions and on a subset of resource elements of the set of resource elements associated with the beacon occasion, the subset of resource elements corresponding to an identifier of the second device. The operations of 1710 may be performed in accordance with examples as disclosed herein. In some examples, aspects of the operations of 1710 may be performed by a signal component 930 as described with reference to FIG. 9.

At 1715, the method may include transmitting a report including an indication of the subset of resource elements associated with the received beacon signal. The operations of 1715 may be performed in accordance with examples as disclosed herein. In some examples, aspects of the operations of 1715 may be performed by a report component 940 as described with reference to FIG. 9.

Figure 18:
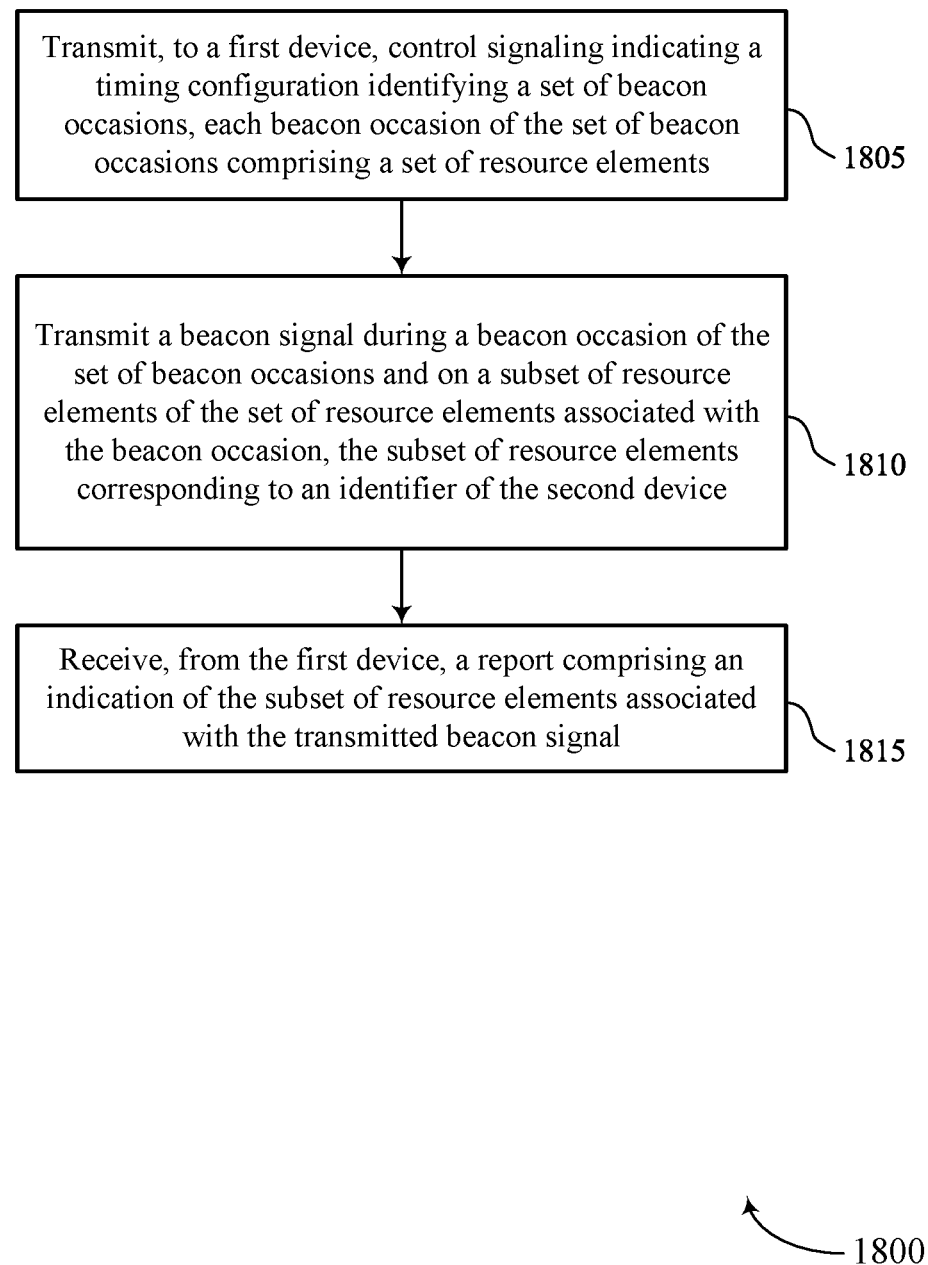

FIG. 18 shows a flowchart illustrating a method 1800 that supports link establishment using leaky-wave antennas in accordance with aspects of the present disclosure. The operations of the method 1800 may be implemented by a device or its components as described herein. For example, the operations of the method 1800 may be performed by a device as described with reference to FIGS. 1 through 6 and 11 through 14. In some examples, a device may execute a set of instructions to control the functional elements of the device to perform the described functions. Additionally or alternatively, the device may perform aspects of the described functions using special-purpose hardware.

At 1805, the method may include transmitting, to a first device, control signaling indicating a timing configuration identifying a set of beacon occasions, each beacon occasion of the set of beacon occasions including a set of resource elements. The operations of 1805 may be performed in accordance with examples as disclosed herein. In some examples, aspects of the operations of 1805 may be performed by a configuration manager 1325 as described with reference to FIG. 13.

At 1810, the method may include transmitting a beacon signal during a beacon occasion of the set of beacon occasions and on a subset of resource elements of the set of resource elements associated with the beacon occasion, the subset of resource elements corresponding to an identifier of the second device. The operations of 1810 may be performed in accordance with examples as disclosed herein. In some examples, aspects of the operations of 1810 may be performed by a preamble manager 1335 as described with reference to FIG. 13.

At 1815, the method may include receiving, from the first device, a report including an indication of the subset of resource elements associated with the transmitted beacon signal. The operations of 1815 may be performed in accordance with examples as disclosed herein. In some examples, aspects of the operations of 1815 may be performed by a report manager 1340 as described with reference to FIG. 13.

Figure 19:
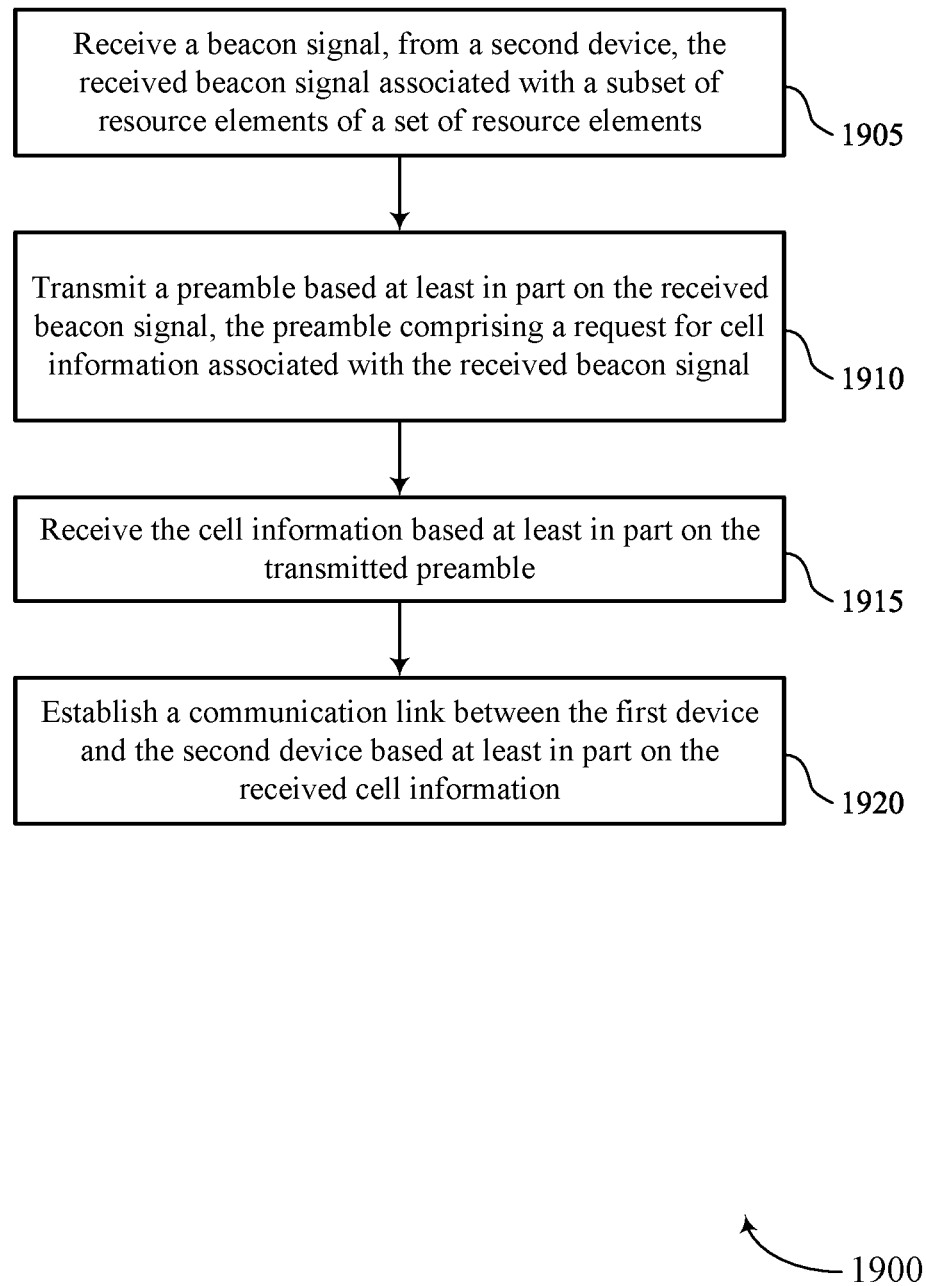

FIG. 19 shows a flowchart illustrating a method 1900 that supports link establishment using leaky-wave antennas in accordance with aspects of the present disclosure. The operations of the method 1900 may be implemented by a device or its components as described herein. For example, the operations of the method 1900 may be performed by a device as described with reference to FIGS. 1 through 10. In some examples, a device may execute a set of instructions to control the functional elements of the device to perform the described functions. Additionally or alternatively, the device may perform aspects of the described functions using special-purpose hardware.

At 1905, the method may include receiving a beacon signal, from a second device, the received beacon signal associated with a subset of resource elements of a set of resource elements. The operations of 1905 may be performed in accordance with examples as disclosed herein. In some examples, aspects of the operations of 1905 may be performed by a signal component 930 as described with reference to FIG. 9.

At 1910, the method may include transmitting a preamble based on the received beacon signal, the preamble including a request for cell information associated with the received beacon signal. The operations of 1910 may be performed in accordance with examples as disclosed herein. In some examples, aspects of the operations of 1910 may be performed by a preamble component 935 as described with reference to FIG. 9.

At 1915, the method may include receiving the cell information based on the transmitted preamble. The operations of 1915 may be performed in accordance with examples as disclosed herein. In some examples, aspects of the operations of 1915 may be performed by a cell component 945 as described with reference to FIG. 9.

At 1920, the method may include establishing a communication link between the first device and the second device based on the received cell information. The operations of 1920 may be performed in accordance with examples as disclosed herein. In some examples, aspects of the operations of 1920 may be performed by a cell component 945 as described with reference to FIG. 9.

Figure 20:
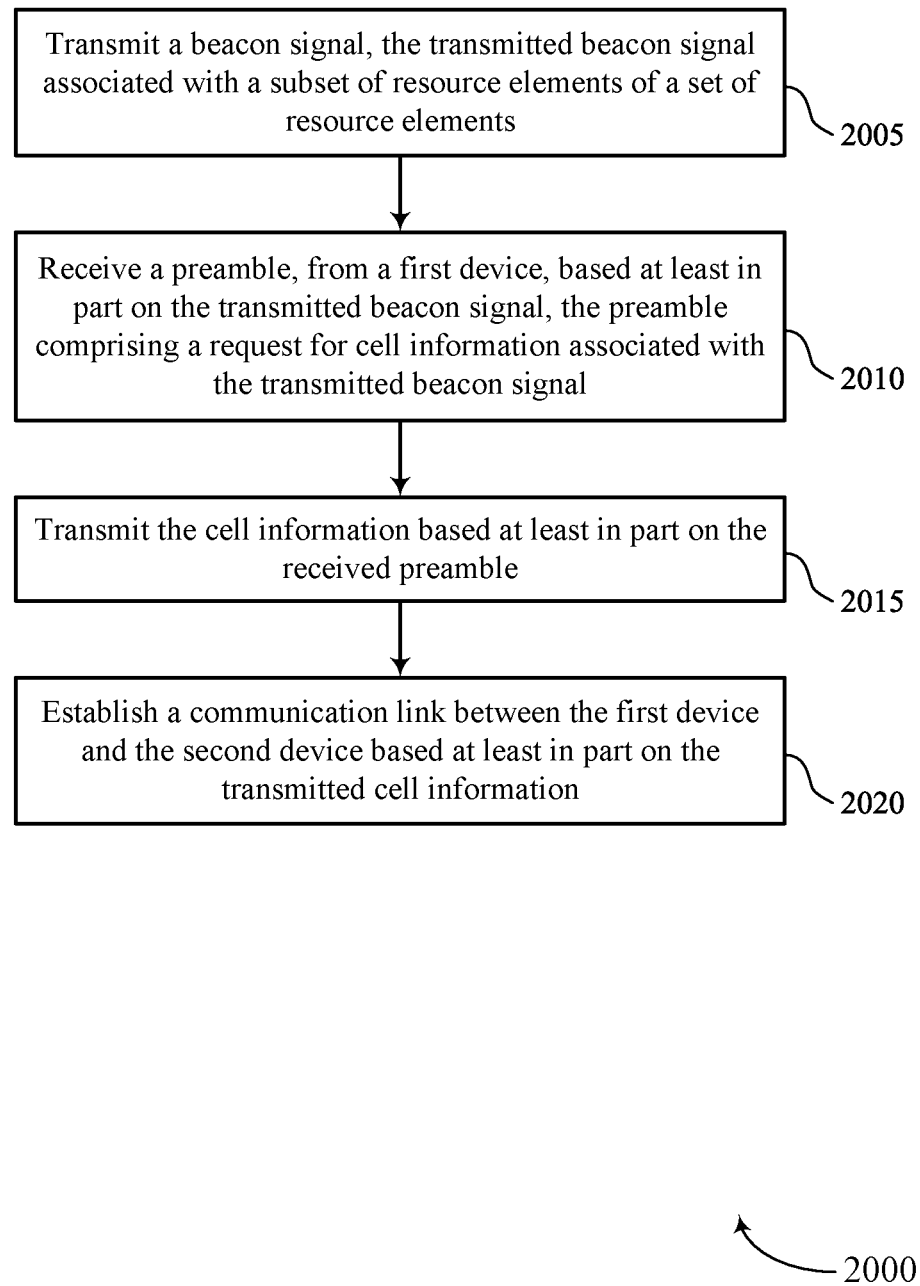

FIG. 20 shows a flowchart illustrating a method 2000 that supports link establishment using leaky-wave antennas in accordance with aspects of the present disclosure. The operations of the method 2000 may be implemented by a device or its components as described herein. For example, the operations of the method 2000 may be performed by a device as described with reference to FIGS. 1 through 6 and 11 through 14. In some examples, a device may execute a set of instructions to control the functional elements of the device to perform the described functions. Additionally or alternatively, the device may perform aspects of the described functions using special-purpose hardware.

At 2005, the method may include transmitting a beacon signal, the transmitted beacon signal associated with a subset of resource elements of a set of resource elements.

The operations of 2005 may be performed in accordance with examples as disclosed herein. In some examples, aspects of the operations of 2005 may be performed by a signal manager 1330 as described with reference to FIG. 13.

At 2010, the method may include receiving a preamble, from a first device, based on the transmitted beacon signal, the preamble including a request for cell information associated with the transmitted beacon signal. The operations of 2010 may be performed in accordance with examples as disclosed herein. In some examples, aspects of the operations of 2010 may be performed by a preamble manager 1335 as described with reference to FIG. 13.

At 2015, the method may include transmitting the cell information based on the received preamble. The operations of 2015 may be performed in accordance with examples as disclosed herein. In some examples, aspects of the operations of 2015 may be performed by a cell manager 1345 as described with reference to FIG. 13.

At 2020, the method may include establishing a communication link between the first device and the second device based on the transmitted cell information. The operations of 2020 may be performed in accordance with examples as disclosed herein. In some examples, aspects of the operations of 2020 may be performed by a cell manager 1345 as described with reference to FIG. 13.

The following provides an overview of aspects of the present disclosure:

Aspect 1: A method for wireless communication at a first device, comprising: receiving, from a second device, a control signal that indicates a plurality of preamble configurations, each preamble configuration of the plurality of preamble configurations corresponding to a respective subset of resource elements of a set of resource elements, a respective angle of a plurality of angles associated with the wireless communication, or a respective power signature identifier of a set of power signature identifiers; receiving, from the second device, a beacon signal; determining a preamble configuration based at least in part on the received beacon signal being associated with one or more of at least one subset of resource elements of the set of resource elements, at least one angle of the plurality of angles associated with the wireless communication, or at least one power signature identifier of the set of power signature identifiers; generating a first preamble based at least in part on the determined preamble configuration; and transmitting the first preamble based at least in part on the generating.

Aspect 2: The method of aspect 1, further comprising: determining, based at least in part on the preamble configuration, one or more of a subcarrier spacing, a preamble duration, a transmit power level, or a cyclic shift value associated with the first preamble, wherein generating the first preamble is based at least in part on one or more of the subcarrier spacing, the preamble duration, the transmit power level, or the cyclic shift value associated with the first preamble.

Aspect 3: The method of any of aspects 1 through 2, wherein the received beacon signal is associated with an angle of the plurality of angles associated with the wireless communication and determining the preamble configuration is based at least in part on the angle associated with the wireless communication being greater than or equal to a threshold.

Aspect 4: The method of any of aspects 1 through 3, wherein the received beacon signal is associated with a power signature identifier of the set of power signature identifiers and determining the preamble configuration is based at least in part on the power signature identifier.

Aspect 5: The method of any of aspects 1 through 4, further comprising: multiplexing the first preamble with a second preamble associated with a third device based at least in part on a time-division multiplexing scheme, a frequency-division multiplexing scheme, or a code-division multiplexing scheme, the second preamble associated with a same preamble configuration as the first preamble, wherein transmitting the first preamble is based at least in part on multiplexing the first preamble with the second preamble associated with the third device.

Aspect 6: The method of any of aspects 1 through 5, wherein the at least one subset of resource elements comprises a subset of frequencies of a set of frequencies.

Aspect 7: The method of any of aspects 1 through 6, further comprising: receiving an indication comprising multiple sets of parameters, wherein each set of parameters corresponds to the at least one power signature identifier of the set of power signature identifiers.

Aspect 8: The method of aspect 7, further comprising: receiving at least one of SI, an RRC configuration message, or an SSB-based configuration including the indication comprising the multiple sets of parameters, wherein determining the set of resource elements is based at least in part on receiving at least one of the SI, the RRC configuration message, or the SSB-based configuration including the indication comprising the multiple sets of parameters.

Aspect 9: A method for wireless communication at a first device, comprising: receiving, from a second device, control signaling indicating a timing configuration identifying a set of beacon occasions, each beacon occasion of the set of beacon occasions comprising a set of resource elements; receiving, from the second device, a beacon signal during a beacon occasion of the set of beacon occasions and on a subset of resource elements of the set of resource elements associated with the beacon occasion, the subset of resource elements corresponding to an identifier of the second device; and transmitting a report comprising an indication of the subset of resource elements associated with the received beacon signal.

Aspect 10: The method of aspect 9, further comprising: demultiplexing the beacon signal based at least in part on one or more of a time-division demultiplexing scheme or a frequency-division demultiplexing scheme, the beacon signal multiplexed with another beacon signal associated with the second device, wherein receiving the beacon signal is based at least in part on demultiplexing the beacon signal.

Aspect 11: The method of any of aspects 9 through 10, further comprising: determining a symbol index associated with the subset of resource elements of the set of resource elements associated with the beacon occasion, wherein the report comprises an indication of the symbol index associated with the subset of resource elements of the set of resource elements associated with the beacon occasion.

Aspect 12: The method of any of aspects 9 through 11, further comprising: determining a resource element group index associated with the subset of resource elements of the set of resource elements associated with the beacon occasion, wherein the report comprises an indication of the resource element group index associated with the subset of resource elements of the set of resource elements associated with the beacon occasion.

Aspect 13: The method of any of aspects 9 through 12, wherein the second device comprises a network entity.

Aspect 14: The method of aspect 13, wherein receiving the control signaling indicating the timing configuration comprises: receiving the control signaling indicating the timing configuration from the second device, wherein the timing configuration is configured by the second device or a centralized unit of the second device.

Aspect 15: A method for wireless communication at a first device, comprising: receiving a beacon signal, from a second device, the received beacon signal associated with a subset of resource elements of a set of resource elements; transmitting a preamble based at least in part on the received beacon signal, the preamble comprising a request for cell information associated with the received beacon signal; receiving the cell information based at least in part on the transmitted preamble; and establishing a communication link between the first device and the second device based at least in part on the received cell information.

Aspect 16: The method of aspect 15, further comprising: determining an offset between a first symbol associated with the beacon signal and a second symbol associated with a preamble occasion, wherein transmitting the preamble is based at least in part on determining the offset between the first symbol associated with the beacon signal and the second symbol associated with the preamble occasion.

Aspect 17: The method of any of aspects 15 through 16, wherein the preamble occupies a second subset of resource elements of the set of resource elements, the second subset of resource elements associated with a narrowband.

Aspect 18: The method of any of aspects 15 through 17, further comprising: receiving at least one of an SSB, a MIB, or a SIB comprising the cell information, wherein establishing the communication link between the first device and the second device is based at least in part on receiving the at least one of the SSBI, the MIB, or the SIB comprising the cell information.

Aspect 19: The method of any of aspects 15 through 18, further comprising: establishing the communication link between the first device and the second device based at least in part on a RNTI of a set of predetermined RNTIs based at least in part on the cell information.

Aspect 20: The method of aspect 19, wherein the RNTI is based at least in part on one or more of a beacon occasion associated with the beacon signal or a preamble occasion associated with the preamble.

Aspect 21: An apparatus for wireless communication at a first device, comprising a processor; memory coupled with the processor; and instructions stored in the memory and executable by the processor to cause the apparatus to perform a method of any of aspects 1 through 8.

Aspect 22: An apparatus for wireless communication at a first device, comprising at least one means for performing a method of any of aspects 1 through 8.

Aspect 23: A non-transitory computer-readable medium storing code for wireless communication at a first device, the code comprising instructions executable by a processor to perform a method of any of aspects 1 through 8.

Aspect 24: An apparatus for wireless communication at a first device, comprising a processor; memory coupled with the processor; and instructions stored in the memory and executable by the processor to cause the apparatus to perform a method of any of aspects 9 through 14.

Aspect 25: An apparatus for wireless communication at a first device, comprising at least one means for performing a method of any of aspects 9 through 14.

Aspect 26: A non-transitory computer-readable medium storing code for wireless communication at a first device, the code comprising instructions executable by a processor to perform a method of any of aspects 9 through 14.

Aspect 27: An apparatus for wireless communication at a first device, comprising a processor; memory coupled with the processor; and instructions stored in the memory and executable by the processor to cause the apparatus to perform a method of any of aspects 15 through 20.

Aspect 28: An apparatus for wireless communication at a first device, comprising at least one means for performing a method of any of aspects 15 through 20.

Aspect 29: A non-transitory computer-readable medium storing code for wireless communication at a first device, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving, from a second device, a control signal that indicates a plurality of preamble configurations associated with transmissions using a slotted waveguide antenna configuration, each preamble configuration of the plurality of preamble configurations corresponding to a respective power signature identifier of a set of power signature identifiers;
   receiving, from the second device using the slotted waveguide antenna configuration, a beacon signal that is associated with an angle of a plurality of angles;
   determining a preamble configuration based at least in part on: (i) the angle of the beacon signal being associated with at least one power signature identifier of the set of power signature identifiers and (ii) the angle associated with the wireless communication being greater than or equal to a threshold;
   generating a first preamble associated with transmission using the slotted waveguide antenna configuration based at least in part on the determined preamble configuration; and
   transmitting, using the slotted waveguide antenna configuration, the first preamble based at least in part on the generating.

2. The method of claim 1, further comprising:
   determining, based at least in part on the preamble configuration, one or more of a subcarrier spacing, a preamble duration, a transmit power level, or a cyclic shift value associated with the first preamble,
   wherein generating the first preamble is based at least in part on one or more of the subcarrier spacing, the preamble duration, the transmit power level, or the cyclic shift value associated with the first preamble.

3. The method of claim 1, wherein the received beacon signal is associated with a power signature identifier of the set of power signature identifiers and wherein determining the preamble configuration is based at least in part on the power signature identifier.

4. The method of claim 1, further comprising:
   multiplexing the first preamble with a second preamble associated with a third device based at least in part on a time-division multiplexing scheme, a frequency-division multiplexing scheme, or a code-division multiplexing scheme, the second preamble associated with a same preamble configuration as the first preamble,
   wherein transmitting the first preamble is based at least in part on multiplexing the first preamble with the second preamble associated with the third device.

5. The method of claim 1, wherein the received beacon signal is associated with at least one subset of resource elements of a set of resource elements and wherein the at least one subset of resource elements comprises a subset of frequencies of a set of frequencies.

6. The method of claim 1, further comprising:
receiving an indication comprising multiple sets of parameters, wherein each set of parameters corresponds to the at least one power signature identifier of the set of power signature identifiers.

7. The method of claim 6, further comprising:
receiving at least one of system information, a radio resource control configuration message, or a synchronization signal block-based configuration including the indication comprising the multiple sets of parameters, wherein determining a set of resource elements is based at least in part on receiving the at least one of the system information, the radio resource control configuration message, or the synchronization signal block-based configuration including the indication comprising the multiple sets of parameters.

8. An apparatus for wireless communication at a first device, comprising:
a processor;
memory coupled with the processor; and
instructions stored in the memory and executable by the processor to cause the apparatus to:
receive, from a second device, a control signal that indicates a plurality of preamble configurations associated with transmissions using a slotted waveguide antenna configuration, each preamble configuration of the plurality of preamble configurations corresponding to a respective power signature identifier of a set of power signature identifiers;
receive, from the second device using the slotted waveguide antenna configuration, a beacon signal that is associated with an angle of a plurality of angles;
determine a preamble configuration based at least in part on: (i) the angle of the beacon signal being associated with at least one power signature identifier of the set of power signature identifiers and (ii) the angle associated with the wireless communication being greater than or equal to a threshold;
generate a first preamble associated with transmission using the slotted waveguide antenna configuration based at least in part on the determined preamble configuration; and
transmit, using the slotted waveguide antenna configuration, the first preamble based at least in part on the generating.

9. The apparatus of claim 8, wherein the instructions are further executable by the processor to cause the apparatus to:
determine, based at least in part on the preamble configuration, one or more of a subcarrier spacing, a preamble duration, a transmit power level, or a cyclic shift value associated with the first preamble,
wherein the instructions to generate the first preamble are further executable by the processor based at least in part on one or more of the subcarrier spacing, the preamble duration, the transmit power level, or the cyclic shift value associated with the first preamble.

10. The apparatus of claim 8, wherein the received beacon signal is associated with a power signature identifier of the set of power signature identifiers, and wherein the instructions to determine the preamble configuration are further executable by the processor based at least in part on the power signature identifier.

11. The apparatus of claim 8, wherein the instructions are further executable by the processor to cause the apparatus to:
multiplex the first preamble with a second preamble associated with a third device based at least in part on a time-division multiplexing scheme, a frequency-division multiplexing scheme, or a code-division multiplexing scheme, the second preamble associated with a same preamble configuration as the first preamble,
wherein the instructions to transmit the first preamble are further executable by the processor based at least in part on multiplexing the first preamble with the second preamble associated with the third device.

12. The apparatus of claim 8, wherein the received beacon signal is associated with at least one subset of resource elements of a set of resource elements and wherein the at least one subset of resource elements comprises a subset of frequencies of a set of frequencies.

13. The apparatus of claim 8, wherein the instructions are further executable by the processor to cause the apparatus to:
receive an indication comprising multiple sets of parameters, wherein each set of parameters corresponds to the at least one power signature identifier of the set of power signature identifiers.

14. The apparatus of claim 13, wherein the instructions are further executable by the processor to cause the apparatus to:
receive at least one of system information, a radio resource control configuration message, or a synchronization signal block-based configuration including the indication comprising the multiple sets of parameters, wherein the instructions to determine a set of resource elements are further executable by the processor based at least in part on receiving at least one of the system information or the radio resource control configuration message including the indication comprising the multiple sets of parameters.

15. An apparatus for wireless communication at a first device, comprising:
means for receiving, from a second device, a control signal that indicates a plurality of preamble configurations associated with transmissions using a slotted waveguide antenna configuration, each preamble configuration of the plurality of preamble configurations corresponding to a respective power signature identifier of a set of power signature identifiers, wherein the respective power signature identifier is associated with a respective angle and a respective frequency;
means for receiving, from the second device using the slotted waveguide antenna configuration, a beacon signal that is associated with an angle of a plurality of angles;
means for determining a preamble configuration based at least in part on: (i) the angle of the beacon signal being associated with at least one power signature identifier of the set of power signature identifiers and (ii) the angle associated with the wireless communication being greater than or equal to a threshold;
means for generating a first preamble associated with transmission using the slotted waveguide antenna configuration based at least in part on the determined preamble configuration; and
means for transmitting, using the slotted waveguide antenna configuration, the first preamble based at least in part on the generating.

16. The apparatus of claim 15, further comprising:
means for determining, based at least in part on the preamble configuration, one or more of a subcarrier spacing, a preamble duration, a transmit power level, or a cyclic shift value associated with the first preamble, wherein means for generating the first preamble is based at least in part on one or more of the subcarrier spacing, the preamble duration, the transmit power level, or the cyclic shift value associated with the first preamble.

17. The apparatus of claim 15, wherein the received beacon signal is associated with a power signature identifier of the set of power signature identifiers and the preamble configuration is determined based at least in part on the power signature identifier.

18. The apparatus of claim 15, further comprising:
means for multiplexing the first preamble with a second preamble associated with a third device based at least in part on a time-division multiplexing scheme, a frequency-division multiplexing scheme, or a code-division multiplexing scheme, the second preamble associated with a same preamble configuration as the first preamble,
wherein means for transmitting the first preamble is based at least in part on multiplexing the first preamble with the second preamble associated with the third device.

19. The apparatus of claim 15, wherein the received beacon signal is associated with at least one subset of resource elements of a set of resource elements and wherein the at least one subset of resource elements comprises a subset of frequencies of a set of frequencies.

20. The apparatus of claim 15, further comprising:
means for receiving an indication comprising multiple sets of parameters, wherein each set of parameters corresponds to the at least one power signature identifier of the set of power signature identifiers.

21. A non-transitory computer-readable medium storing code for wireless communication, the code comprising instructions executable by one or more processors to:
receive, from a second device, a control signal that indicates a plurality of preamble configurations associated with transmissions using a slotted waveguide antenna configuration, each preamble configuration of the plurality of preamble configurations corresponding to a respective power signature identifier of a set of power signature identifiers;
receive, from the second device using the slotted waveguide antenna configuration, a beacon signal that is associated with an angle of a plurality of angles;
determine a preamble configuration based at least in part on: (i) the angle of the beacon signal being associated with at least one power signature identifier of the set of power signature identifiers and (ii) the angle associated with the wireless communication being greater than or equal to a threshold;
generate a first preamble associated with transmission using the slotted waveguide antenna configuration based at least in part on the determined preamble configuration; and
transmit, using the slotted waveguide antenna configuration, the first preamble based at least in part on the generating.

22. The non-transitory computer-readable medium of claim 21, wherein the instructions are further executable by the one or more processors to:
determine, based at least in part on the preamble configuration, one or more of a subcarrier spacing, a preamble duration, a transmit power level, or a cyclic shift value associated with the first preamble,
wherein to generate the first preamble is based at least in part on one or more of the subcarrier spacing, the preamble duration, the transmit power level, or the cyclic shift value associated with the first preamble.

23. The non-transitory computer-readable medium of claim 21, wherein the received beacon signal is associated with a power signature identifier of the set of power signature identifiers and the preamble configuration is determined based at least in part on the power signature identifier.

24. The non-transitory computer-readable medium of claim 21, wherein the instructions are further executable by the one or more processors to:
multiplex the first preamble with a second preamble associated with a third device based at least in part on a time-division multiplexing scheme, a frequency-division multiplexing scheme, or a code-division multiplexing scheme, the second preamble associated with a same preamble configuration as the first preamble,
wherein to transmit the first preamble is based at least in part on multiplexing the first preamble with the second preamble associated with the third device.

25. The non-transitory computer-readable medium of claim 21, wherein the received beacon signal is associated with at least one subset of resource elements of a set of resource elements and wherein the at least one subset of resource elements comprises a subset of frequencies of a set of frequencies.

26. The non-transitory computer-readable medium of claim 21, wherein the instructions are further executable by the one or more processors to:
receive an indication comprising multiple sets of parameters, wherein each set of parameters corresponds to the at least one power signature identifier of the set of power signature identifiers.

\* \* \* \* \*